(12) United States Patent
Choi

(10) Patent No.: US 10,705,522 B2
(45) Date of Patent: Jul. 7, 2020

(54) METHOD FOR CONTROLLING OPERATION SYSTEM OF A VEHICLE

(71) Applicant: LG Electronics Inc., Seoul (KR)

(72) Inventor: Heedong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 15/857,757

(22) Filed: Dec. 29, 2017

(65) Prior Publication Data

US 2019/0094855 A1 Mar. 28, 2019

(30) Foreign Application Priority Data

Sep. 22, 2017 (KR) .......................... 10-2017-0122784

(51) Int. Cl.
  *G05D 1/00* (2006.01)
  *G01C 21/32* (2006.01)
  (Continued)

(52) U.S. Cl.
  CPC ........... *G05D 1/0061* (2013.01); *B60W 30/06* (2013.01); *B60W 50/082* (2013.01); *G01C 21/26* (2013.01); *G01C 21/32* (2013.01); *G01C 21/3602* (2013.01); *G05D 1/0223* (2013.01); *G05D 1/0238* (2013.01); *G05D 1/0274* (2013.01);
  (Continued)

(58) Field of Classification Search
  CPC .. G05D 1/0061; G05D 1/0223; G05D 1/0238; G05D 1/0274; G05D 1/0276; G05D 2201/0213; B60W 30/06; B60W 50/082; B60W 2540/30; B60W 2550/10; B60W 2550/40; B60W 2720/10; G01C 21/26;
  (Continued)

(56) References Cited

U.S. PATENT DOCUMENTS

| | | | |
|---|---|---|---|
| 2017/0212525 A1* | 7/2017 | Wang | G01C 21/3697 |
| 2018/0025235 A1* | 1/2018 | Fridman | G06K 9/00791 |
| | | | 382/103 |
| 2019/0051153 A1* | 2/2019 | Giurgiu | G01C 21/3691 |

FOREIGN PATENT DOCUMENTS

| | | |
|---|---|---|
| KR | 1020120079341 | 7/2012 |
| KR | 101708676 | 3/2017 |

(Continued)

OTHER PUBLICATIONS

Extended European Search Report in European Appln. No. EP 18194645.0-1003, dated Feb. 27, 2019, 11 pages.

*Primary Examiner* — Calvin Cheung
(74) *Attorney, Agent, or Firm* — Fish & Richardson P.C.

(57) ABSTRACT

A method for controlling a vehicle includes: determining whether map data for a first geographic section is stored in memory; and based on the map data having been stored: generating, through an object detection device and when the vehicle drives through the first geographic section by user control, first object information regarding vehicle surroundings; and storing first map data based on the first object information. The method further includes: based on the first map data having been stored, generating, based on the stored first map data, a driving route and driving control information for the first geographic section; generating, through the object detection device and when the vehicle drives along the driving route through the first geographic section, second object information regarding vehicle surroundings; and updating and storing the first map data based on the second object information.

19 Claims, 26 Drawing Sheets

(51) Int. Cl.
*G01C 21/26* (2006.01)
*G08G 1/0962* (2006.01)
*G01C 21/36* (2006.01)
*B60W 30/06* (2006.01)
*B60W 50/08* (2020.01)
*G05D 1/02* (2020.01)

(52) U.S. Cl.
CPC ....... *G05D 1/0276* (2013.01); *G08G 1/09623* (2013.01); *B60W 2540/30* (2013.01); *B60W 2554/00* (2020.02); *B60W 2556/45* (2020.02); *B60W 2720/10* (2013.01); *G05D 2201/0213* (2013.01)

(58) Field of Classification Search
CPC . G01C 21/32; G01C 21/3602; G08G 1/09623
See application file for complete search history.

(56) References Cited

FOREIGN PATENT DOCUMENTS

| KR | 1020170025552 | 3/2017 |
| WO | WO2017079341 | 5/2017 |

* cited by examiner

METHOD FOR CONTROLLING OPERATION SYSTEM OF A VEHICLE

CROSS-REFERENCE TO RELATED APPLICATIONS

This application claims the benefit of an earlier filing date and right of priority to Korean Patent Application No. 10-2017-0122784, filed on Sep. 22, 2017, which is hereby incorporated by reference as if fully set forth herein.

TECHNICAL FIELD

The present disclosure relates to controlling an operation system of a vehicle.

BACKGROUND

A vehicle is a device that carries a passenger in a passenger-intended direction. A car is a common example of a vehicle.

To increase the convenience of users, a vehicle is typically equipped with various sensors and electronic devices. For example, an Advanced Driver Assistance System (ADAS) and autonomous vehicles are typically designed to increase the driving convenience of users.

SUMMARY

Implementations disclosed herein enable systems and techniques for controlling an operation system of a vehicle that may, in some scenarios, enhance autonomous driving capability of the vehicle by utilizing adaptive learning.

In one aspect, a method for controlling a vehicle includes: determining, by at least one processor, whether map data for a first geographic section has been stored in at least one memory. The method further includes, based on a determination that map data for the first geographic section has not been stored: generating, through an object detection device and in a first state in which the vehicle drives through the first geographic section according to a user-input-based control, first object information related to surroundings of the vehicle driving through the first geographic section; and storing, by the at least one processor and in the at least one memory, first map data based on the first object information that was generated in the first state in which the vehicle drives through the first geographic section. The method further includes, based on the first map data for the first geographic section having been stored in the at least one memory, generating, by the at least one processor and based on the stored first map data, a driving route and driving control information for driving the vehicle through the first geographic section. The method further includes generating, through the object detection device and in a second state in which the vehicle drives along the generated driving route through the first geographic section, second object information related to surroundings of the vehicle driving through the first geographic section; updating, by the at least one processor, the stored first map data based on the second object information to generate second map data; and storing, by the at least one processor and in the at least one memory, the second map data.

In some implementations, generating the first object information in the first state in which the vehicle drives through the first geographic section according to the user-input-based control includes: receiving, through a communication device of the vehicle and from at least one of a server, another vehicle, or a pedestrian, object information about an object located in the first geographic section.

In some implementations, storing the first map data based on the first object information that was generated in the first state in which the vehicle drives through the first geographic section according to the user-input-based control includes: determining, based on the first object information, at least one of (i) first object location information indicating a location of an object in the first geographic section, or (ii) first object shape information indicating a shape of an object in the first geographic region; determining the first map data based on the at least one of the first object location information or the first object shape information; and storing the first map data that was determined based on the at least one of the first object location information or the first object shape information.

In some implementations, updating the stored first map data to generate the second map data based on the second object information that was generated in the second state in which the vehicle drives along the generated driving route through the first geographic section includes: determining whether at least a portion of the second object information matches the stored first map data; and updating the stored first map data to generate the second map data based on a result of determining whether at least a portion of the second object information matches the stored first map data.

In some implementations, the method further includes: controlling, by the at least one processor, a vehicle drive device of the vehicle to perform autonomous driving of the vehicle based on the driving route and the driving control information that were generated from the stored first map data for driving the vehicle through the first geographic section.

In some implementations, the method further includes: based on a determination that the at least a portion of the second object information is not reflected in the stored first map data: controlling the vehicle drive to perform autonomous driving based on the driving route and the driving control information at a second speed that is smaller than a first speed at which the vehicle drive device performs autonomous driving based on the driving route and the driving control information prior to the determination that the at least a portion of the second object information is not reflected in the stored first map data.

In some implementations, controlling the vehicle drive device to perform autonomous driving based on the driving route and the driving control information that were generated from the stored first map data for driving the vehicle through the first geographic section includes: determining a coverage rate that indicates a size of a first geographic area for which object information has been stored relative to a size of a second geographic area for which object information has not been stored; determining whether autonomous driving is appropriate based on the coverage rate; and controlling the vehicle drive device to enable autonomous driving of the vehicle based on a determination that autonomous driving is appropriate.

In some implementations, the determination of whether autonomous driving is appropriate includes: determining, based on the coverage rate, an available driving mode from among a plurality of driving modes that includes at least two of a manned autonomous driving mode, an unmanned autonomous driving mode, or a manual driving mode.

In some implementations, the determination of whether autonomous driving is appropriate includes: determining, based on the driving route, a plurality of sections of the driving route that have different coverage rates; and determining whether autonomous driving is appropriate for at least one section among the plurality of sections of the driving route.

In some implementations, the method further includes: determining, based on the coverage rate in the first geographic section, a park-out path along which the vehicle drive device is to perform autonomous driving to exit from a parking space; and controlling the vehicle drive device to perform autonomous driving of the vehicle to exit from the parking space according to the determined park-out path.

In some implementations, the method further includes: determining, based on the coverage rate in the first geographic section, a park-in path along which the vehicle drive device is to perform autonomous driving to enter a parking space; and controlling the vehicle drive device to perform autonomous driving of the vehicle to enter the parking space according to the determined park-in path.

In some implementations, updating the stored first map data to generate the second map data based on the second object information that was generated in the second state in which the vehicle drives along the generated driving route through the first geographic section includes: determining, based on the second object information, at least one of (i) second object location information indicating a location of an object in the first geographic section, or (ii) second object shape information indicating a shape of an object in the first geographic region; and updating the first map data to generate the second map data based on the at least one of the second object location information or the second object shape information.

In some implementations, the determining of whether at least a portion of the second object information matches the stored first map data is further based on the second object location information. The updating of the stored first map data to generate the second map data includes: based on a determination that a portion of the second object information does not match the stored first map data based on the second object location information, generating the second map data by updating the stored first map data to include the portion of the second object information that is determined not to match the stored first map data.

In some implementations, determining whether at least a portion of the second object information matches the stored first map data includes: determining, based on the second object location information, whether at least a portion of the second object information matches the stored first map data; and based on a determination that a first portion of the second object information matches the stored first map data based on the object location information, determining whether the first portion of the second object information matches the stored first map data based on the object shape information. The updating of the stored first map data to generate the second map data includes: based on a determination that the first portion of the second object information matches the stored first map data based on the object location information, and that the first portion of the second object information does not match the stored first map data based on the object shape information, generating the second map data by updating the stored first map data to include the first portion of the second object information.

In some implementations, the stored first map data includes a plurality of stored first map data, each of the plurality of stored first map data corresponding to a respective time period. Updating the stored first map data to generate the second map data includes updating the plurality of stored first map data classified according to the respective time period.

In some implementations, each of the plurality of stored first map data further includes information about a traffic congestion degree of the first geographic section for the corresponding time period.

In some implementations, the generation of the driving route and driving control information for driving the vehicle through the first geographic section includes: determining, based on the plurality of stored first map data classified according to respective time periods, a driving pattern including a lane change operation; and generating the driving route and the driving control information based on the plurality of stored first map data classified according to the respective time periods and based on the driving pattern.

In some implementations, the updating of the stored first map data to generate the second map data includes updating the stored first map data to include a driving history of a driver in the first geographic section.

In some implementations, the map data includes first information for a fixed object and second information for a mobile object.

In another aspect, an operation system of a vehicle includes: an object detection device; at least one processor; and at least one computer-readable medium having stored thereon instructions that, when executed by the at least one processor, cause the at least one processor to perform operations including: generating, through the object detection device, object information about surroundings of the vehicle driving through a first geographic section; determining whether at least one portion of the object information that matches stored map data; updating the stored map data based on a result of determining whether at least one portion of the object information matches the stored map data; storing the updated map data; and generating a driving route for the vehicle based on the updated map data. The driving route includes a prior driving route that was generated based on the map data prior to the updating of the map data.

It is to be understood that both the foregoing general description and the following detailed description of the present disclosure are exemplary and explanatory and are intended to provide further explanation of the present disclosure as claimed.

DETAILED DESCRIPTION

Autonomous vehicles that self-drive based on learning have recently been developed. For example, an autonomous vehicle learns a driving environment and/or a driving route in a learning mode, and executes an operating mode based on the premise that the learning is completed.

In this context, there is a need for a control method for increasing the driving capability of an autonomous vehicle based on continuous learning.

The term 'vehicle' used in the present disclosure may include any suitable motorized vehicle, such as a car and a motorcycle. The following description is given based on an example of a vehicle as a car.

In the present disclosure, a vehicle may be any of an internal combustion vehicle equipped with an engine as a power source, a hybrid vehicle equipped with an engine and an electrical motor as power sources, an electric vehicle equipped with an electrical motor as a power source, and so on.

In the following description, the left of a vehicle refers to the left of a driving direction of the vehicle, and the right of the vehicle refers to the right of the driving direction of the vehicle.

Figure 1:
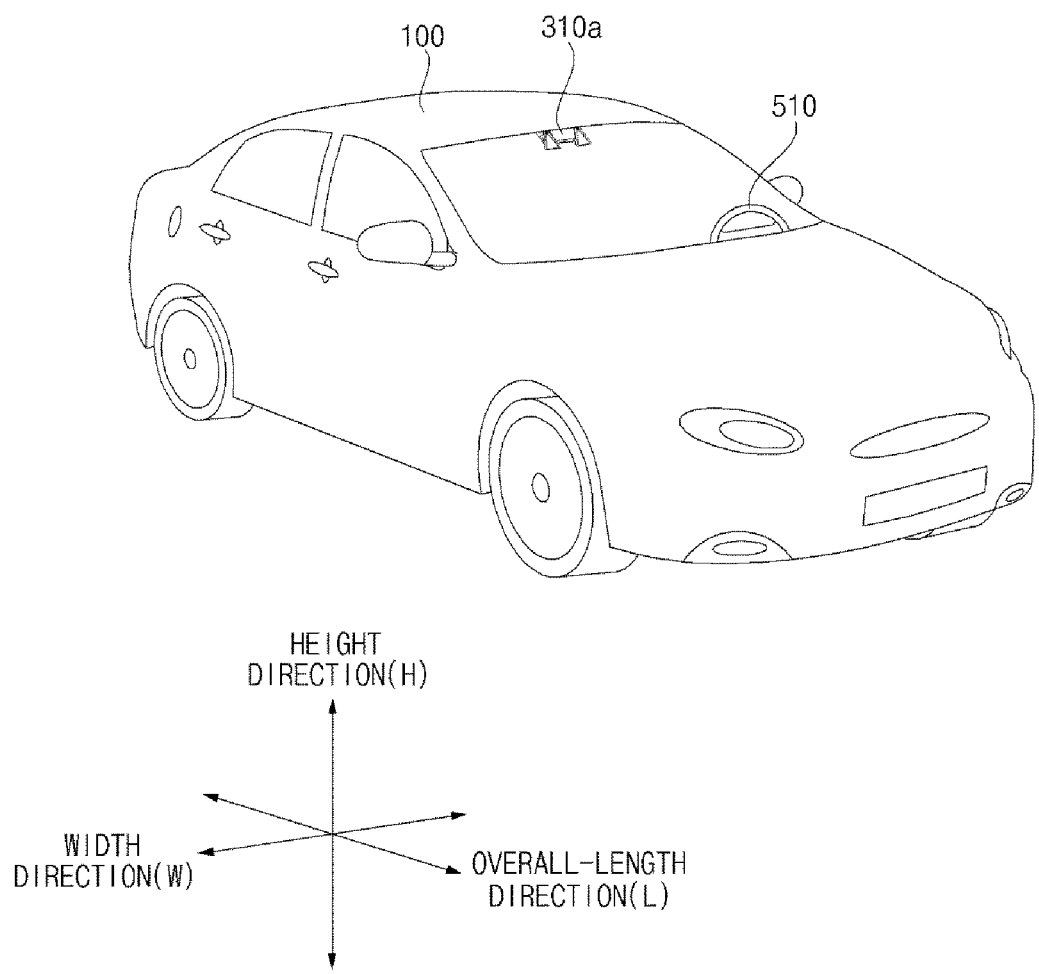
FIG. 1 is a view illustrating the exterior of a vehicle according to an implementation of the present disclosure.
Figure 2:
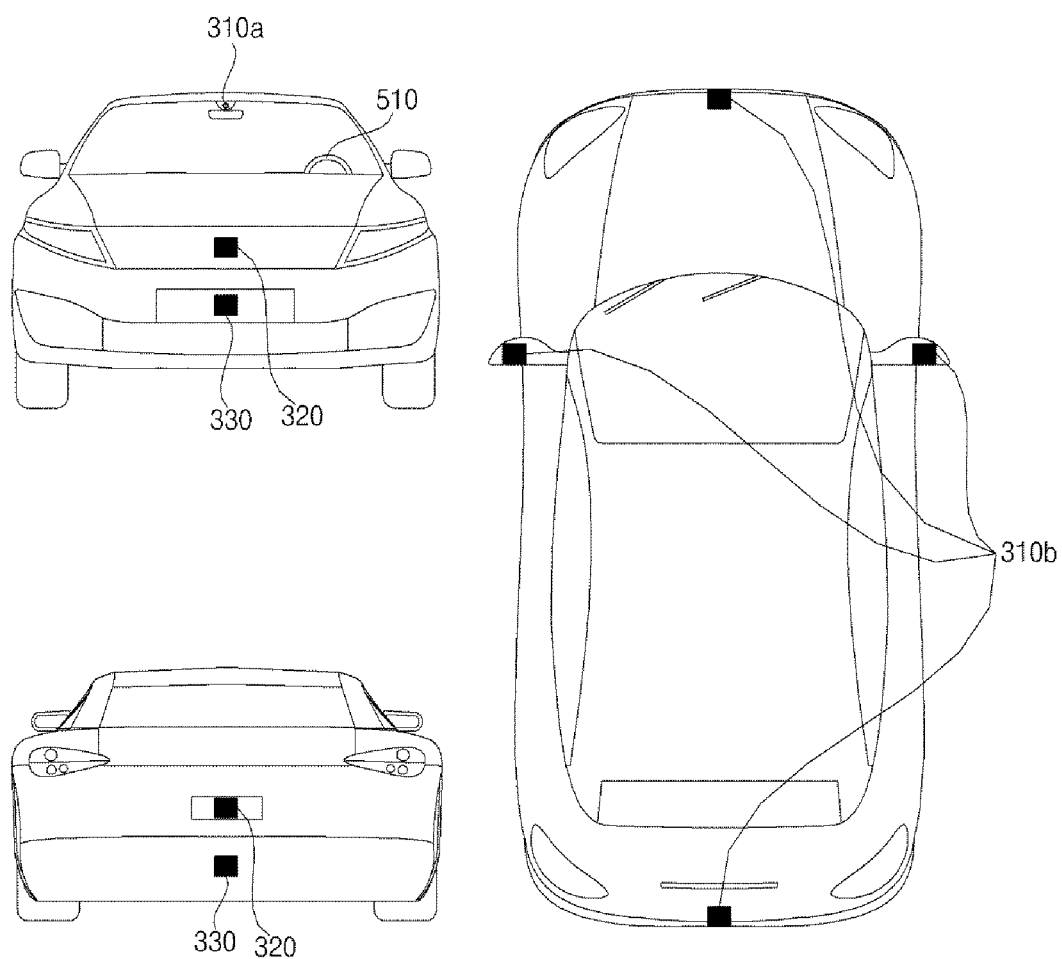
FIG. 2 is a view illustrating exteriors of a vehicle, seen at various angles from the outside of the vehicle according to an implementation of the present disclosure.
Figure 3:
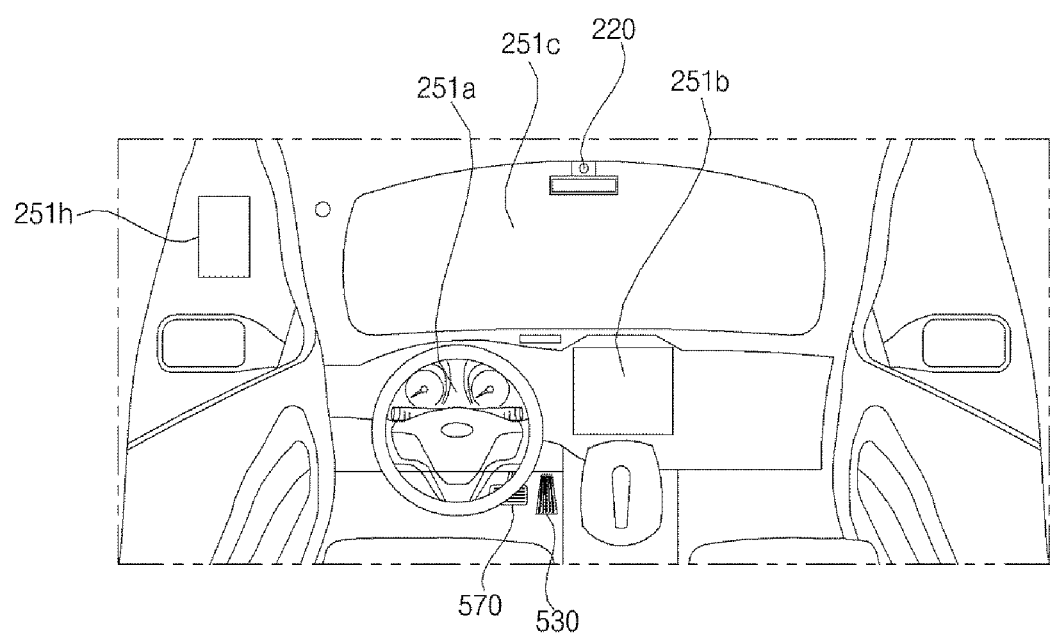
FIGS. 3 and 4 are views illustrating interiors of a vehicle according to an implementation of the present disclosure.
Figure 4:
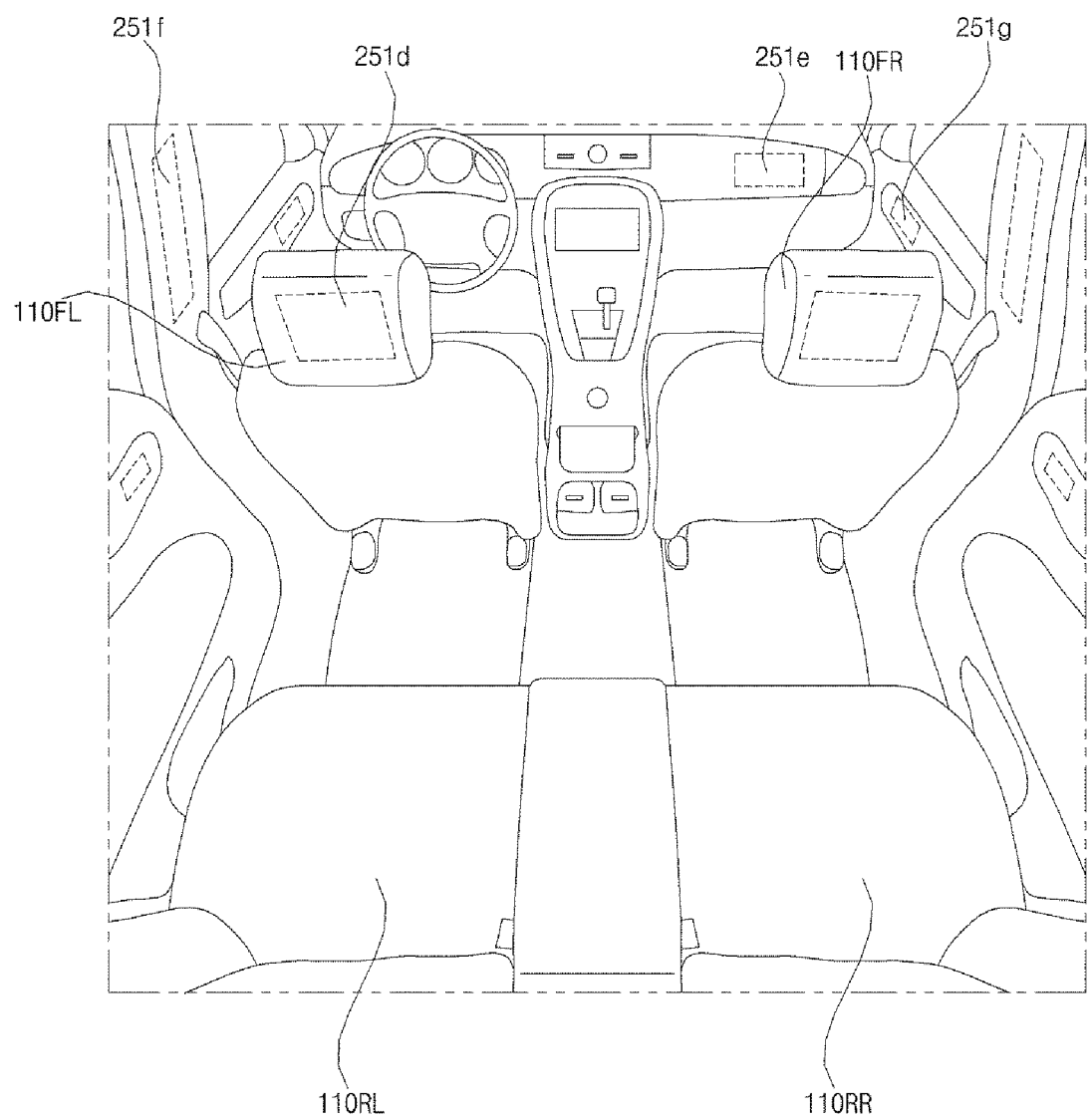
Figure 5:
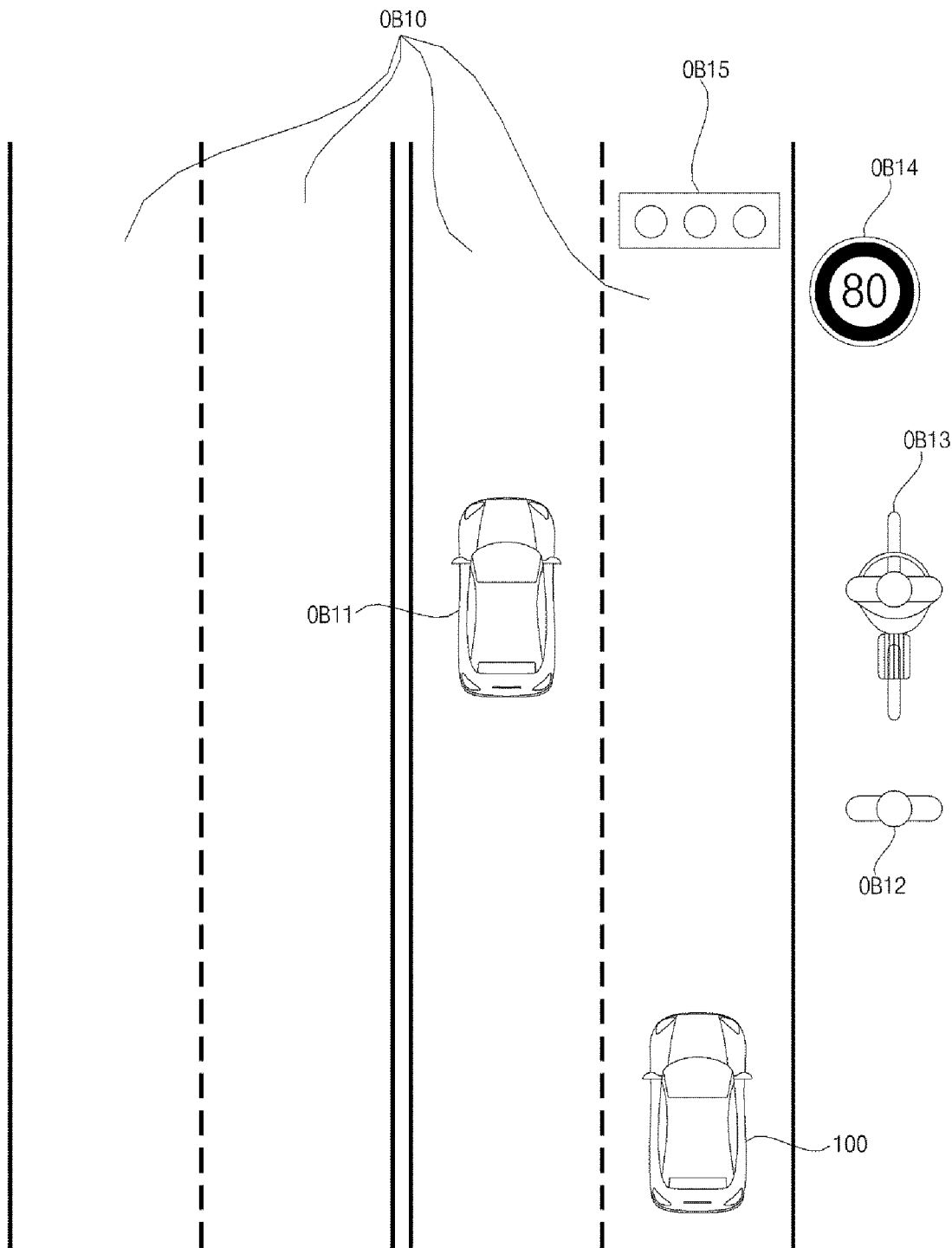
FIGS. 5 and 6 are views referred to for describing objects according to an implementation of the present disclosure.
Figure 6:
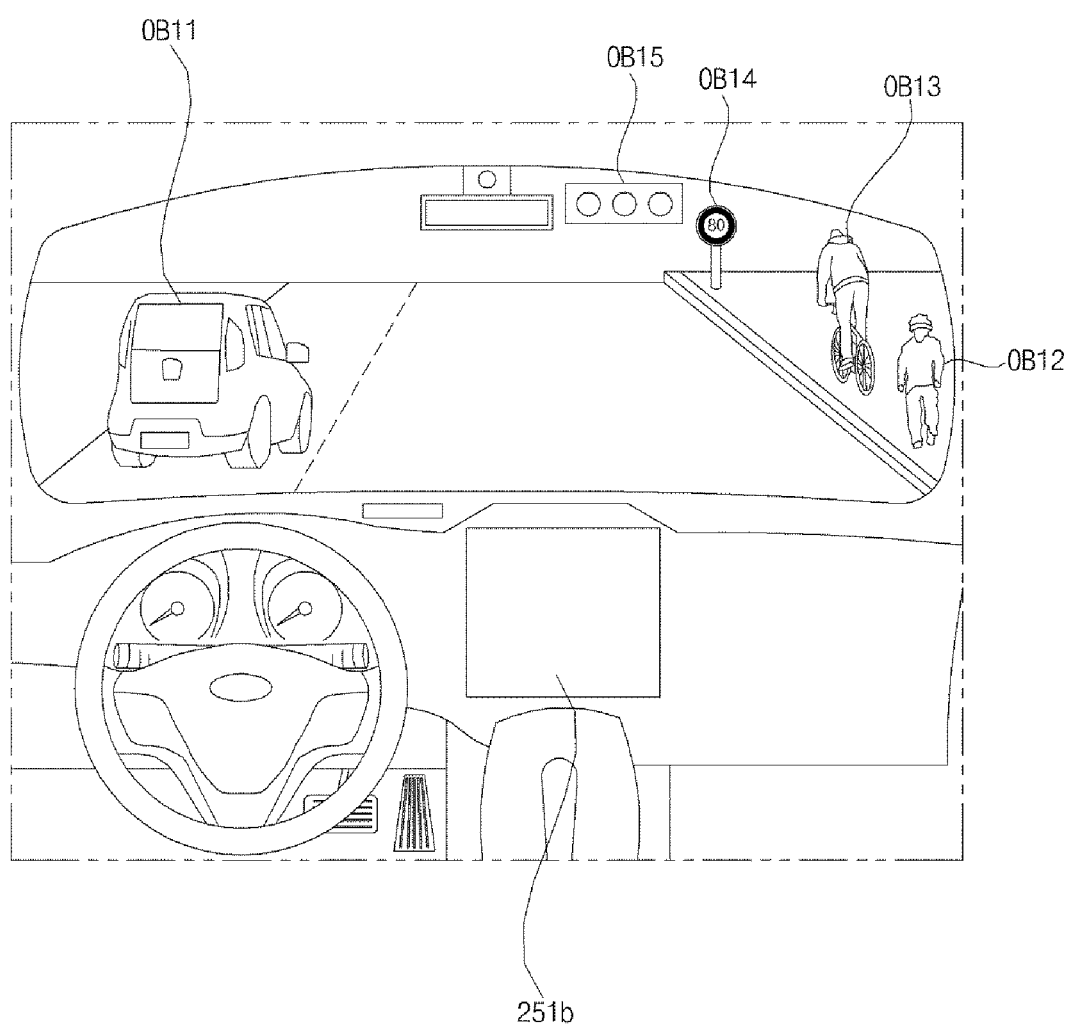
Figure 7:
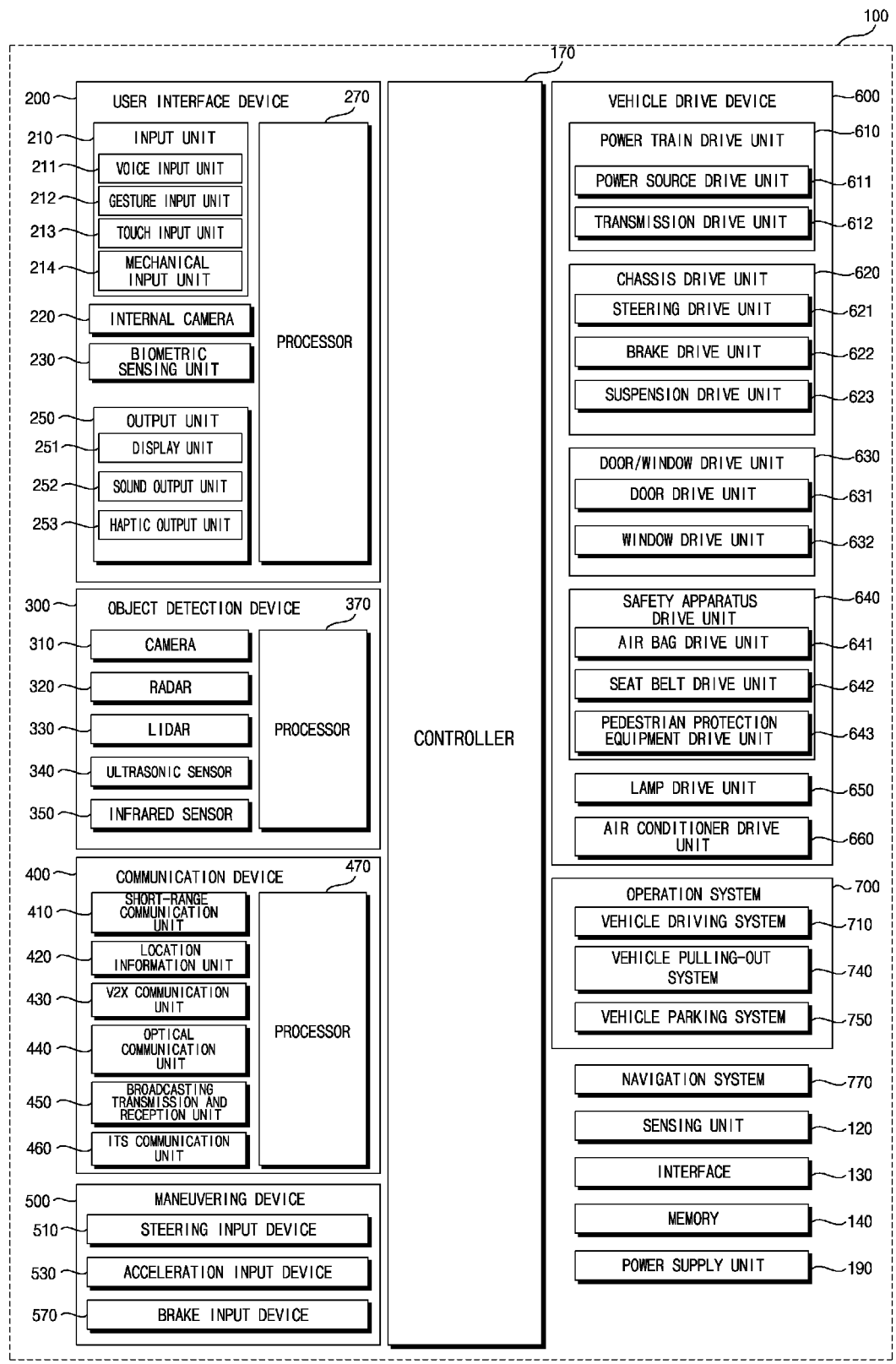
FIG. 7 is a block diagram of a vehicle according to an implementation of the present disclosure.

FIG. 1 is a view illustrating the exterior of a vehicle according to an implementation of the present disclosure, FIG. 2 is a view illustrating exteriors of a vehicle, seen at various angles from the outside of the vehicle according to an implementation of the present disclosure, FIGS. 3 and 4 are views illustrating interiors of a vehicle according to an implementation of the present disclosure, FIGS. 5 and 6 are views referred to for describing objects according to an implementation of the present disclosure, and FIG. 7 is a block diagram of a vehicle according to an implementation of the present disclosure.

Referring to FIGS. 1 to 7, a vehicle 100 may include wheels rotated by a power source, and a steering input device 510 for controlling a driving direction of the vehicle 100.

The vehicle 100 may be an autonomous vehicle.

The vehicle 100 may switch to an autonomous driving mode or a manual mode according to a user input.

For example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on driving situation information.

The driving situation information may include at least one of object information being information about objects outside the vehicle 100, navigation information, or vehicle state information.

For example, the vehicle 100 may switch from the manual mode to the autonomous driving mode or from the autonomous driving mode to the manual mode, based on driving situation information generated from an object detection device 300.

For example, the vehicle 100 may switch from the manual mode to the autonomous driving mode or from the autonomous driving mode to the manual mode, based on driving situation information generated from a communication device 400.

The vehicle 100 may switch from the manual mode to the autonomous driving mode or from the autonomous driving mode to the manual mode, based on information, data, or a signal received from an external device.

If the vehicle 100 drives in the autonomous driving mode, the autonomous vehicle 100 may drive based on an operation system 700.

For example, the autonomous vehicle 100 may drive based on information, data, or signals generated from a vehicle driving system 710, a vehicle pulling-out system 740, and a vehicle parking system.

If the vehicle 100 drives in the manual mode, the autonomous vehicle 100 may receive a user input for driving through a maneuvering device 500. The vehicle 100 may drive based on the user input received through the maneuvering device 500.

An overall length refers to a length from the front side to the rear side of the vehicle 100, an overall width refers to a width of the vehicle 100, and an overall height refers to a length from the bottom of a wheel to the roof of the vehicle 100. In the following description, an overall length direction L may refer to a direction based on which the overall length of the vehicle 700 is measured, an overall width direction W may refer a direction based on which the overall width of the vehicle 700 is measured, and an overall height direction H may refer a direction based on which the overall height of the vehicle 700 is measured.

Referring to FIG. 7, the vehicle 100 may include the User interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

According to an implementation, the vehicle 100 may further include a new component in addition to the components described in the present disclosure, or may not include a part of the described components.

The sensing unit 120 may sense a state of the vehicle 100. The sensing unit 120 may include a posture sensor (e.g., a yaw sensor, a roll sensor, and a pitch sensor), a collision sensor, a wheel sensor, a speed sensor, an inclination sensor, a weight sensor, a heading sensor, a yaw sensor, a gyro sensor, a position module, a vehicle forward/backward sensor, a battery sensor, a fuel sensor, a tire sensor, a handle rotation-based steering sensor, a vehicle internal temperature sensor, a vehicle internal humidity sensor, an ultrasonic sensor, an illumination sensor, an accelerator pedal position sensor, a brake pedal position sensor, and so on.

The sensing unit 120 may acquire sensing signals for vehicle posture information, vehicle collision information, vehicle heading information, vehicle location information (Global Positioning System (GPS) information), vehicle angle information, vehicle speed information, vehicle acceleration information, vehicle inclination information, vehicle forward/backward information, battery information, fuel information, tire information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 120 may further include an accelerator pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and so on.

The sensing unit 120 may generate vehicle state information based on sensing data. The vehicle state information may be information generated based on data sensed by various sensors in the vehicle 100.

For example, the vehicle state information may include vehicle posture information, vehicle speed information, vehicle inclination information, vehicle weight information, vehicle heading information, vehicle battery information, vehicle fuel information, vehicle tire pressure information, vehicle steering information, vehicle internal temperature information, vehicle internal humidity information, pedal position information, vehicle engine temperature information, and so on.

The interface 130 may serve paths to various types of external devices connected to the vehicle 100. For example, the interface 130 may be provided with a port connectable to a mobile terminal, and may be connected to a mobile terminal through the port. In this case, the interface 130 may exchange data with the mobile terminal.

In some implementations, the interface 130 may serve as a path in which electric energy is supplied to a connected mobile terminal. If a mobile terminal is electrically connected to the interface 130, the interface 130 may supply electric energy received from the power supply unit 190 to the mobile terminal under the control of the controller 170.

The memory 140 is electrically connected to the controller 170. The memory 140 may store basic data for a unit, control data for controlling an operation of the unit, and input and output data. The memory 140 may be any of various storage devices in hardware, such as a Read Only Memory (ROM), a Random Access Memory (RAM), an Erasable and Programmable ROM (EPROM), a flash drive, and a hard drive. The memory 140 may store various data for overall operations of the vehicle 100, such as programs for processing or controlling in the controller 170.

According to an implementation, the memory 140 may be integrated with the controller 170, or configured as a lower-layer component of the controller 170.

The controller 170 may provide overall control to each unit inside the vehicle 100. The controller 170 may be referred to as an Electronic Control Unit (ECU).

The power supply unit 190 may supply power needed for operating each component under the control of the controller 170. Particularly, the power supply unit 190 may receive power from a battery within the vehicle 100.

One or more processors and the controller 170 in the vehicle 100 may be implemented using at least one of Application Specific Integrated Circuits (ASICs), Digital Signal Processors (DSPs), Digital Signal Processing Devices (DSPDs), Programmable Logic Device (PLDs), Field Programmable Gate Arrays (FPGAs), processors, controllers, micro-controllers, microprocessors, and an electrical unit for executing other functions.

Further, the sensing unit 120, the interface 130, the memory 140, the power supply unit 190, the User interface device 200, the object detection device 300, the communication device 400, the maneuvering device 500, the vehicle drive device 600, the operation system 700, and the navigation system 770 may have individual processors or may be integrated into the controller 170.

The User interface device 200 is a device used to enable the vehicle 100 to communicate with a user. The User interface device 200 may receive a user input, and provide information generated from the vehicle 100 to the user. The vehicle 100 may implement UIs or User Experience (UX) through the User interface device 200.

The User interface device 200 may include an input unit 210, an internal camera 220, a biometric sensing unit 230, an output unit 250, and a processor 270. Each component of the User interface device 200 may be separated from or integrated with the afore-described interface 130, structurally and operatively.

According to an implementation, the User interface device 200 may further include a new component in addition to components described below, or may not include a part of the described components.

The input unit 210 is intended to receive information from a user. Data collected by the input unit 210 may be analyzed and processed as a control command from the user by the processor 270.

The input unit 210 may be disposed inside the vehicle 100. For example, the input unit 210 may be disposed in an area of a steering wheel, an area of an instrument panel, an area of a seat, an area of each pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an InfraRed (IR) sensor and an image sensor, for sensing a gesture input of the user.

According to an implementation, the gesture input unit 212 may sense a Three-Dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided the processor 270 or the controller 170.

The touch input unit 213 may include a touch sensor for sensing a touch input of the user.

According to an implementation, a touch screen may be configured by integrating the touch input unit 213 with a display unit 251. This touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, a center fascia, the center console, a cockpit module, a door, or the like.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire a vehicle interior image. The processor 270 may sense a state of a user based on the vehicle interior image. The processor 270 may acquire information about the gaze of a user in the vehicle interior image. The processor 270 may sense a user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and so on of a user, using the sensor. The biometric information may be used for user authentication.

The output unit 250 is intended to generate a visual output, an acoustic output, or a haptic output.

The output unit 250 may include at least one of the display unit 251, an audio output unit 252, or a haptic output unit 253.

The display unit 251 may display graphic objects corresponding to various pieces of information.

The display unit 251 may include at least one of a Liquid Crystal Display (LCD), a Thin-Film Transistor LCD (TFT LCD), an Organic Light Emitting Diode (OLED) display, a flexible display, a 3D display, or an e-ink display.

A touch screen may be configured by forming a multi-layered structure with the display unit 251 and the touch input unit 213 or integrating the display unit 251 with the touch input unit 213.

The display unit 251 may be configured as a Head Up Display (HUD). If the display is configured as a HUD, the display unit 251 may be provided with a projection module, and output information by an image projected onto the windshield or a window.

The display unit 251 may include a transparent display. The transparent display may be attached onto the windshield or a window.

The transparent display may display a specific screen with a specific transparency. To have a transparency, the transparent display may include at least one of a transparent Thin Film Electroluminescent (TFFL) display, a transparent OLED display, a transparent LCD, a transmissive transparent display, or a transparent LED display. The transparency of the transparent display is controllable.

In some implementations, the User interface device 200 may include a plurality of display units 251a to 251g.

The display unit 251 may be disposed in an area of the steering wheel, areas 251a, 251b and 251e of the instrument panel, an area 251d of a seat, an area 251f of each pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 to an audio signal, and outputs the audio signal. For this purpose, the audio output unit 252 may include one or more speakers.

The haptic output unit 253 generates a haptic output. For example, the haptic output unit 253 may vibrate the steering wheel, a safety belt, a seat 110FL, 110FR, 110RL, or 110RR, so that a user may perceive the output.

The processor 270 may provide overall control to each unit of the User interface device 200.

According to an implementation, the User interface device 200 may include a plurality of processors 270 or no processor 270.

If the User interface device 200 does not include any processor 270, the User interface device 200 may operate under the control of a processor of another device in the vehicle 100, or under the control of the controller 170.

In some implementations, the User interface device 200 may be referred to as a vehicle display device.

The User interface device 200 may operate under the control of the controller 170.

The object detection device 300 is a device used to detect an object outside the vehicle 100. The object detection device 300 may generate object information based on sensing data.

The object information may include information indicating the presence or absence of an object, information about the location of an object, information indicating the distance between the vehicle 100 and the object, and information about a relative speed of the vehicle 100 with respect to the object.

An object may be any of various items related to driving of the vehicle 100.

Referring to FIGS. 5 and 6, objects O may include lanes OB10, another vehicle OB11, a pedestrian OB12, a 2-wheel vehicle OB13, traffic signals OB14 and OB15, light, a road, a structure, a speed bump, topography, an animal, and so on.

The lanes OB10 may include a driving lane, a lane next to the driving lane, and a lane in which an opposite vehicle is driving. The lanes OB10 may include left and right lines that define each of the lanes.

The other vehicle OB11 may be a vehicle driving in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The 2-wheel vehicle OB13 may refer to a transportation mechanism designed to move on two wheels, located around the vehicle 100. The 2-wheel vehicle OB13 may be a transportation mechanism having two wheels, located within a predetermined distance from the vehicle 100. For example, the 2-wheel vehicle OB13 may be a motorbike or bicycle on a sidewalk or a roadway.

The traffic signals may include a traffic signal lamp OB15, a traffic sign OB14, and a symbol or text drawn or written on a road surface.

The light may be light generated from a lamp of another vehicle. The light may be generated from a street lamp. The light may be sunlight.

The road may include a road surface, a curb, a ramp such as a down-ramp or an up-ramp, and so on.

The structure may be an object fixed on the ground, near to a road. For example, the structure may be any of a street lamp, a street tree, a building, a telephone pole, a signal lamp, and a bridge.

The topography may include a mountain, a hill, and so on.

In some implementations, objects may be classified into mobile objects and fixed objects. For example, the mobile objects may include another vehicle and a pedestrian. For example, the fixed objects may include a traffic signal, a road, and a structure.

The object detection device 300 may include a camera 310, a Radio Detection and Ranging (RADAR) 320, a Light Detection and Ranging (LiDAR) 330, an ultrasonic sensor 340, an Infrared sensor 350, and a processor 370. The components of the object detection device 300 may be separated from or integrated with the afore-described sensing unit 120, structurally and operatively.

According to an implementation, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310a, Around View Monitoring (AVM) cameras 310b, or a 360-degree camera.

The camera 310 may acquire information about the location of an object, information about a distance to the object, or information about a relative speed with respect to the object by any of various image processing algorithms.

For example, the camera 310 may acquire information about a distance to an object and information about a relative speed with respect to the object in an acquired image, based on a variation in the size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310a.

For example, to acquire an image of what lies ahead of the vehicle 100, the camera 310 may be disposed in the vicinity of a front windshield inside the vehicle 100. Or the camera 310 may be disposed around a front bumper or a radiator grill.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Or the camera 310 may be disposed around a side mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or beside the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in a driven manner, the LiDAR 330 may be rotated by a motor and detect an object around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or beside the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or beside the vehicle 100.

The Infrared sensor 350 may include an IR transmitter and an IR receiver. The Infrared sensor 350 may detect an object by IR light, and determine the location, distance, and relative speed of the detected object.

The Infrared sensor 350 may be disposed at an appropriate position on the exterior of the vehicle 100 in order to sense an object ahead of, behind, or beside the vehicle 100.

The processor 370 may provide overall control to each unit of the object detection device 300.

The processor 370 may detect or classify an object by comparing data sensed by the camera 310, the RADAR 320, the LiDAR 330, the ultrasonic sensor 340, and the Infrared sensor 350 with pre-stored data.

The processor 370 may detect an object and track the detected object, based on an acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in the size of the object over time.

For example, the processor 370 may acquire information about a distance to an object and information about a relative speed with respect to the object from an image acquired from the stereo camera 310a.

For example, the processor 370 may acquire information about a distance to an object and information about a relative speed with respect to the object from an image acquired from the stereo camera 310a, based on disparity information.

The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

As described before, once the vehicle 100 starts the learning mode in response to a user input to the input unit 210, the processor 370 may store data sensed by the camera 310, the RADAR 320, the LiDAR 330, the ultrasonic sensor 340, and the Infrared sensor 350.

Each step of the learning mode based on analysis of stored data, and an operating mode following the learning mode will be described later in detail in relation to the operation system 700. According to an implementation, the object detection device 300 may include a plurality of processors 370 or no processor 370. For example, the camera 310, the RADAR 320, the LiDAR 330, the ultrasonic sensor 340, and the Infrared sensor 350 may include individual processors.

If the object detection device 300 includes no processor 370, the object detection device 300 may operate under the control of a processor of a device in the vehicle 100 or under the control of the controller 170.

The object detection device 300 may operate under the control of the controller 170.

The communication device 400 is used to communicate with an external device. The external device may be another vehicle, a mobile terminal, or a server.

The communication device 400 may include at least one of a transmission antenna and a reception antenna, for communication, and a Radio Frequency (RF) circuit and device, for implementing various communication protocols.

The communication device 400 may include a short-range communication unit 410, a location information unit 420, a Vehicle to Everything (V2X) communication unit 430, an optical communication unit 440, a Broadcasting Transmission and reception Unit 450, an Intelligent Transport System (ITS) communication unit 460, and a processor 470.

According to an implementation, the communication device 400 may further include a new component in addition to components described below, or may not include a part of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a GPS module or a Differential Global Positioning System (DGPS) module.

The V2X communication unit 430 is a unit used for wireless communication with a server (by Vehicle to Infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

According to an implementation, the optical transmitter may be integrated with a lamp included in the vehicle 100.

The Broadcasting Transmission and reception Unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may provide overall control to each unit of the communication device 400.

According to an implementation, the communication device 400 may include a plurality of processors 470 or no processor 470.

If the communication device 400 does not include any processor 470, the communication device 400 may operate under the control of a processor of another device in the vehicle 100 or under the control of the controller 170.

In some implementations, the communication device 400 may be configured along with the User interface device 200, as a vehicle multimedia device. In this case, the vehicle multimedia device may be referred to as a telematics device or an Audio Video Navigation (AVN) device.

The communication device 400 may operate under the control of the controller 170.

The maneuvering device 500 is a device used to receive a user command for driving the vehicle 100.

In the manual mode, the vehicle 100 may drive based on a signal provided by the maneuvering device 500.

The maneuvering device 500 may include the steering input device 510, an acceleration input device 530, and a brake input device 570.

The steering input device 510 may receive a driving direction input for the vehicle 100 from a user. The steering input device 510 is preferably configured as a wheel for enabling a steering input by rotation. According to an implementation, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. According to an implementation, the acceleration input device 530 or the brake input device 570 may be configured as a touch screen, a touchpad, or a button.

The maneuvering device 500 may operate under the control of the controller 170.

The vehicle drive device 600 is a device used to electrically control driving of various devices of the vehicle 100.

The vehicle drive device 600 may include at least one of a power train driving unit 610, a chassis drive unit 620, a door/window drive unit 630, a safety apparatus drive unit 640, a lamp drive unit 650, and an air conditioner drive unit 660.

According to an implementation, the vehicle drive device 600 may further include a new component in addition to components described below or may not include a part of the components.

In some implementations, the vehicle drive device 600 may include a processor. Each individual unit of the vehicle drive device 600 may include a processor.

The power train driving unit 610 may control operation of a power train device.

The power train driving unit 610 may include a power source drive unit 611 and a transmission drive unit 612.

The power source drive unit 611 may control a power source of the vehicle 100.

For example, if the power source is a fossil fuel-based engine, the power source drive unit 610 may perform electronic control on the engine. Therefore, the power source drive unit 610 may control an output torque of the engine, and the like. The power source drive unit 611 may adjust the engine output torque under the control of the controller 170.

For example, if the power source is an electrical energy-based motor, the power source drive unit 610 may control the motor. The power source drive unit 610 may adjust a rotation speed, torque, and so on of the motor under the control of the controller 170.

The transmission drive unit 612 may control a transmission.

The transmission drive unit 612 may adjust a state of the transmission. The transmission drive unit 612 may adjust the state of the transmission to drive D, reverse R, neutral N, or park P.

If the power source is an engine, the transmission drive unit 612 may adjust an engagement state of a gear in the drive state D.

The chassis drive unit 620 may control operation of a chassis device.

The chassis drive unit 620 may include a steering drive unit 621, a brake drive unit 622, and a suspension drive unit 623.

The steering drive unit 621 may perform electronic control on a steering device in the vehicle 100. The steering drive unit 621 may change a driving direction of the vehicle 100.

The brake drive unit 622 may perform electronic control on a brake device in the vehicle 100. For example, the brake drive unit 622 may decrease the speed of the vehicle 100 by controlling an operation of a brake disposed at a tire.

In some implementations, the brake drive unit 622 may control a plurality of brakes individually. The brake drive unit 622 may differentiate braking power applied to a plurality of wheels.

The suspension drive unit 623 may perform electronic control on a suspension device in the vehicle 100. For example, if the surface of a road is rugged, the suspension drive unit 623 may control the suspension device to reduce jerk of the vehicle 100.

In some implementations, the suspension drive unit 623 may control a plurality of suspensions individually.

The door/window drive unit 630 may perform electronic control on a door device or a window device in the vehicle 100.

The door/window drive unit 630 may include a door drive unit 631 and a window drive unit 632.

The door drive unit 631 may perform electronic control on a door device in the vehicle 100. For example, the door drive unit 631 may control opening and closing of a plurality of doors in the vehicle 100. The door drive unit 631 may control opening or closing of the trunk or the tail gate. The door drive unit 631 may control opening or closing of the sunroof.

The window drive unit 632 may perform electronic control on a window device in the vehicle 100. The window drive unit 632 may control opening or closing of a plurality of windows in the vehicle 100.

The safety apparatus drive unit 640 may perform electronic control on various safety devices in the vehicle 100.

The safety apparatus drive unit 640 may include an air bag drive unit 641, a seat belt drive unit 642, and a pedestrian protection equipment drive unit 643.

The air bag drive unit 641 may perform electronic control on an airbag device in the vehicle 100. For example, the air bag drive unit 641 may control inflation of an airbag, upon sensing an emergency situation.

The seat belt drive unit 642 may perform electronic control on a seatbelt device in the vehicle 100. For example, the seat belt drive unit 642 may control securing of passengers on the seats 110FL, 110FR, 110RL, and 110RR by means of seatbelts, upon sensing a danger.

The pedestrian protection equipment drive unit 643 may perform electronic control on a hood lift and a pedestrian airbag in the vehicle 100. For example, the pedestrian protection equipment drive unit 643 may control hood lift-up and inflation of the pedestrian airbag, upon sensing collision with a pedestrian.

The lamp drive unit 650 may perform electronic control on various lamp devices in the vehicle 100.

The air conditioner drive unit 660 may perform electronic control on an air conditioner in the vehicle 100. For example, if a vehicle internal temperature is high, the air conditioner driver 660 may control the air conditioner to operate and supply cool air into the vehicle 100.

The vehicle drive device 600 may include a processor. Each individual unit of the vehicle drive device 600 may include a processor.

The vehicle drive device 600 may operate under the control of the controller 170.

The operation system 700 is a system that controls various operations of the vehicle 100. The operation system 700 may operate in the autonomous driving mode.

The operation system 700 may include the vehicle driving system 710, the vehicle pulling-out system 740, and the vehicle parking system 750.

According to an implementation, the operation system 700 may further include a new component in addition to components described below or may not include a part of the described components.

In some implementations, the operation system 700 may include a processor. Each individual unit of the operation system 700 may include a processor.

In some implementations, the operation system 700 may control driving in the autonomous driving mode based on learning. In this case, the learning mode and an operating mode based on the premise of completion of learning may be performed. A description will be given below of a method for executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for the driving route. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous driving mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an implementation, the processor of the operation system 700 may drive the vehicle 100 along the learned driving route by controlling the operation system 710 in the operating mode.

According to an implementation, the processor of the operation system 700 may take out the vehicle 100 from the learned parking space by controlling the vehicle pulling-out system 740 in the operating mode.

According to an implementation, the processor of the operation system 700 may park the vehicle 100 in the learned parking space by controlling the vehicle parking system 750 in the operating mode.

Figure 8:
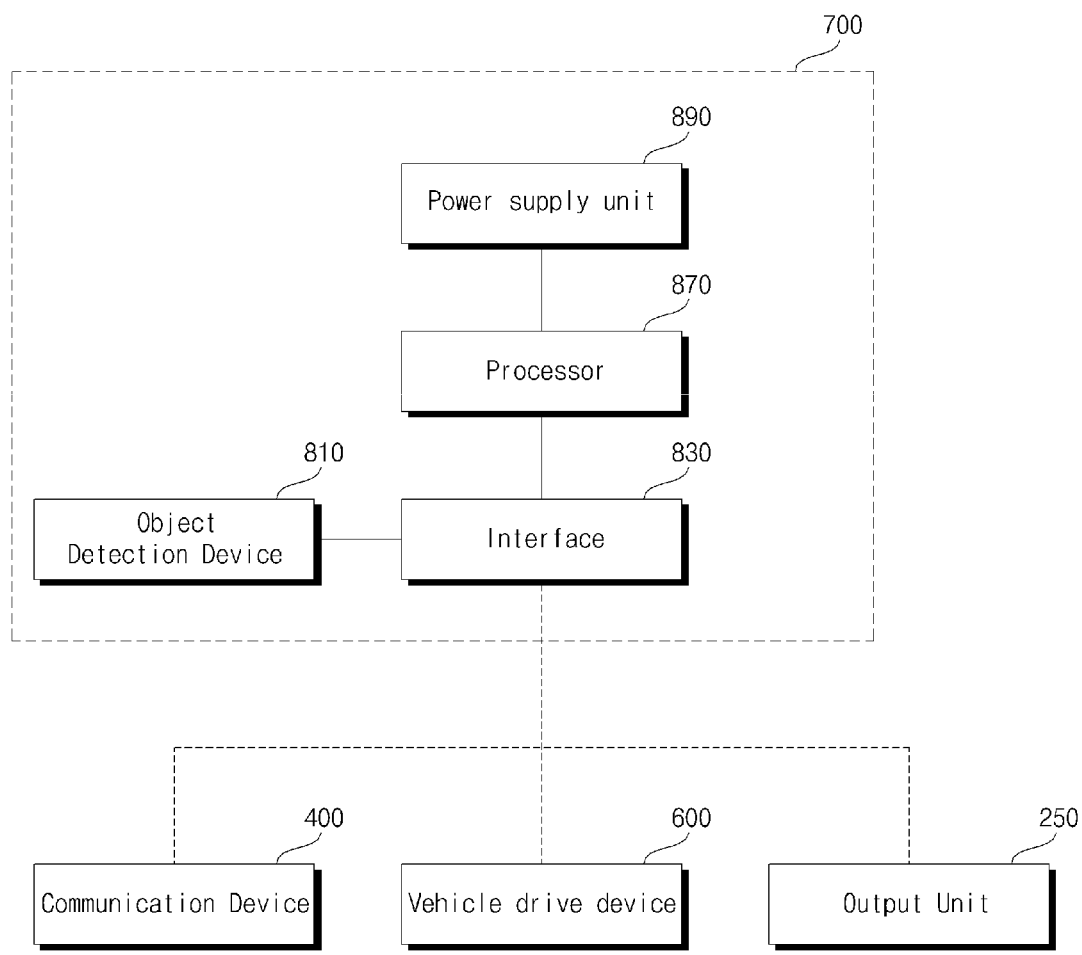
FIG. 8 is a block diagram of an operation system according to an implementation of the present disclosure.

With reference to FIG. 8, a method for executing the learning mode and the operating mode by a processor 870 according to an implementation of the present disclosure will be described below.

According to an implementation, if the operation system 700 is implemented in software, then the operation system 700 may be implemented by at least one processor, such as controller 170.

According to an implementation, the operation system 700 may include at least one of the User interface device 200, the object detection device 300, the communication device 400, the maneuvering device 500, the vehicle drive device 600, the navigation system 770, the sensing unit 120, or the controller 170.

The vehicle driving system 710 may drive of the vehicle 100.

The vehicle driving system 710 may drive of the vehicle 100 by providing a control signal to the vehicle drive device 600 based on navigation information received from the navigation system 770.

The vehicle driving system 710 may drive the vehicle 100 by providing a control signal to the vehicle drive device 600 based on object information received from the object detection device 300.

The vehicle driving system 710 may drive the vehicle 100 by receiving a signal from an external device through the communication device 400 and providing a control signal to the vehicle drive device 600.

The vehicle driving system 710 may be a system that drives the vehicle 100, including at least one of the User interface device 200, the object detection device 300, the communication device 400, the maneuvering device 500, the vehicle drive device 600, the navigation system 770, the sensing unit 120, or the controller 170.

The vehicle driving system 710 may be referred to as a vehicle driving control device.

The vehicle pulling-out system 740 may perform park-out of the vehicle 100.

The vehicle pulling-out system 740 may perform park-out of the vehicle 100 by providing a control signal to the vehicle drive device 600 based on navigation information received from the navigation system 770.

The vehicle pulling-out system 740 may perform park-out of the vehicle 100 by providing a control signal to the vehicle drive device 600 based on object information received from the object detection device 300.

The vehicle pulling-out system 740 may perform park-out of the vehicle 100 by receiving a signal from an external device through the communication device 400 and providing a control signal to the vehicle drive device 600.

The vehicle pulling-out system 740 may be a system that performs park-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle park-out control device.

The vehicle parking system 750 may perform park-in of the vehicle 100.

The vehicle parking system 750 may perform park-in of the vehicle 100 by providing a control signal to the vehicle drive device 600 based on navigation information received from the navigation system 770.

The vehicle parking system 750 may perform park-in of the vehicle 100 by providing a control signal to the vehicle drive device 600 based on object information received from the object detection device 300.

The vehicle parking system 750 may perform park-in of the vehicle 100 by receiving a signal from an external device through the communication device 400 and providing a control signal to the vehicle drive device 600.

The vehicle parking system 750 may be a system that performs park-in of the vehicle 100, including at least one of the User interface device 200, the object detection device 300, the communication device 400, the maneuvering device 500, the vehicle drive device 600, the navigation system 770, the sensing unit 120, or the controller 170.

The vehicle parking system 750 may be referred to as a vehicle park-in control device.

The navigation system 770 may provide navigation information. The navigation information may include at least one of map information, set destination information, route information based on setting of a destination, information about various objects on a route, lane information, or information about a current location of a vehicle.

The navigation system 770 may include a memory and a processor. The memory may store navigation information. The processor may control operation of the navigation system 770.

According to an implementation, the navigation system 770 may receive information from an external device through the communication device 400 and update pre-stored information using the received information.

According to an implementation, the navigation system 770 may be classified as a lower-layer component of the User interface device 200.

FIG. 8 is a block diagram of an operation system according to an implementation of the present disclosure.

Referring to FIG. 8, the operation system 700 may include an object detection device 810, an interface 830, a processor 870, and a power supply unit 890.

According to an implementation, the operation system 700 may further include a new component in addition to components described in the present disclosure, or may not include a part of the described components.

The object detection device 810 is a device used to detect an object outside the vehicle 100. The object detection device 810 may generate object information based on sensing data.

The object information may include information indicating the presence or absence of an object, information about the location of the object, information indicating the distance between the vehicle 100 and the object, and information about a relative speed of the vehicle 100 with respect to the object.

The object detection device 810 may include a camera, a RADAR, a LiDAR, an ultrasonic sensor, an Infrared sensor, and a processor. Each of the components of the object detection device 810 may be separated from or integrated with at least one of the afore-described sensing unit 120 or object detection device 300, structurally and operatively.

According to an implementation, the object detection device 810 may further include a new component in addition to components described below or may not include a part of the described components.

The object detection device 810 may be the object detection device 300 of the vehicle 100. The object detection device 810 may be configured separately from the object detection device 300 of the vehicle 100.

The description of the object detection device 300 may be applied to the object detection device 810.

The object detection device 810 may generate object information about the surroundings of the vehicle 100 during driving of the vehicle 100.

The object detection device 810 may generate object information about the surroundings of the vehicle 100 that drives in a first geographic section.

The first geographic section may be at least a part of a driving route in which the vehicle 100 is driving or will drive.

The processor 870 may generate map data based on information detected through the object detection device 810.

The map data may include object location information and object shape information.

The object location information may be information about the location of an object in geographical coordinates. The object location information may include 3D coordinates in a 3D space.

The object shape information may be information about a 3D shape of the object.

The object shape information may be generated by processing stereo image information. The stereo image information may be acquired by subjecting information detected by a stereo camera to image processing. The stereo image information may be acquired by subjecting a plurality of images capture by a camera to image processing. The image processing may refer to processing a plurality of images by a disparity technique.

The object shape information may be generated by subjecting a plurality of images captured by a mono camera to image processing. The image processing may refer to processing a plurality of images by a disparity technique.

The processor 870 may control the object detection device 810 to generate object information about the surroundings of the vehicle 100 that drives, in a manual mode set by a user input, through the first geographic section.

The processor 870 may control the object detection device 810 to generate object information about the surroundings of the vehicle 100 that drives in the semi-autonomous driving mode by receiving a user input temporarily or continuously through the maneuvering device 500.

The processor 870 may control the object detection device 810 to generate object information about the surroundings of the vehicle 100 that drives in the first geographic section in the autonomous driving mode.

The interface 830 may serve paths to various types of external devices connected to the operation system 700. The interface 830 may exchange information, signals, or data with another device included in the vehicle 100. The interface 830 may transmit the received information, signal, or data to the processor 870. The interface 830 may transmit information, a signal, or data generated or processed by the processor 870 to another device included in the vehicle 100.

The interface 830 may be identical to the interface 130. The interface 830 may be included in the operation system 700, separately from the interface 130. The interface 830 may serve as paths to various types of external devices connected to the vehicle 100.

The processor 870 may provide overall control to each component of the operation system 700.

The processor 870 may execute the learning mode and the operating mode.

The processor 870 may be implemented using at least one of an ASIC, a DSP, a DSPD, a PLD, an FPGA, a processor, a controller, a micro-controller, a microprocessor, or an electrical unit for executing other functions.

Further, the sensing unit 120, the interface 130, the memory 140, the power supply unit 190, the User interface device 200, the object detection device 300, the communication device 400, the maneuvering device 500, the vehicle drive device 600, the operation system 700, the navigation system 770, and the operation system 700 may have individual processors or may be integrated into the controller 170.

The description of the processor of the operation system 700 may be applied to the processor 870.

The processor 870 may determine whether map data for a first geographic section has been stored in a memory.

The first geographic section may be at least a part of a driving route in which the vehicle 100 is driving or will drive.

The map data may include object location information and object shape information.

The object location information may be information about the location of an object in geographical coordinates. The object location information may include 3D coordinates in a 3D space.

The object shape information may be information about the 3D shape of the object.

The information about the 3D shape of the object may be generated by processing stereo image information. The stereo image information may be acquired by subjecting information detected by a stereo camera to image processing. The stereo image information may be acquired by subjecting a plurality of images captured by a camera to image processing.

The information about the 3D shape of the object may be generated by subjecting a plurality of images captured by a mono camera to image processing. The image processing may refer to processing a plurality of images by a disparity technique.

The map data may include information about a fixed object and information about a mobile object.

A fixed object refers to an object fixed at a certain position, distinguishable from a mobile object. Fixed objects may include a road, a traffic sign, a median strip, a curbstone, a barrier, and so on.

A mobile object refers to an object which is not fixed at a certain position, distinguishable from a fixed object fixed at a certain position. Mobile objects may include another vehicle, a pedestrian, and so on.

The processor 870 may generate a driving route using the map data, which will be described below in detail.

While the vehicle 100 is driving in the first geographic section, the processor 870 may control the object detection device 810 to generate object information about the surroundings of the vehicle 100.

While the vehicle 100 is driving in the first geographic section in the manual mode or the autonomous driving mode, the processor 870 may control the object detection device 810 to generate object information about the surroundings of the vehicle 100.

The autonomous driving mode may include the semi-autonomous operating mode requiring a part of user manipulations of the maneuvering device 500 and the full autonomous operating mode requiring no user manipulation of the maneuvering device 500.

The processor 870 may control the communication device 400 to receive first object information about an object in the first geographic section from another vehicle or a pedestrian.

The processor 870 may receive object information for the first geographic section from a traffic information receiver through the communication device 400.

The processor 870 may receive the first object information by wireless communication with a server (V2I), another vehicle (V2V), or a pedestrian (V2P).

The processor 870 may store map data based on the object information.

For example, the processor 870 may generate the map data based on location information about each object included in the object information. The processor 870 may store the generated map data in at least one memory, such as the memory 140.

In some implementations, the processor 870 may store separate map data for different lanes of a road, such as an up lane and a down lane, of the first geographic section based on the object information. In some scenarios, the processor 870 may store map data for a first lane while the vehicle 100 is driving in a second lane.

For example, if the processor 870 collects object information about a down lane during driving in an up lane in the first geographic section, the processor 870 may generate map data based on object information about the down lane in the first geographic section.

The processor 870 may identify a line or bulkhead that separates an up lane from a down lane based on the object information.

The processor 870 may calculate movement of another vehicle based on the object information, and identify an up lane and a down lane in the first geographic section based on information about the movement of the other vehicle.

As the operation system 700 having the above-described configuration generates map data about a route other than a route in which the vehicle 100 has driven directly, a driving route may be generated fast when the vehicle 100 drives in the corresponding route.

The processor 870 may generate a driving route and driving control information for driving in the first geographic section, based on the stored map data.

A driving route is a path in which the vehicle 100 is to drive, which may include a distance and a time.

A driving route may include information about a path extending from a first point to a second point along which the vehicle 100 moves, and may include a distance and a time.

The driving control information may be control information required for the processor 870 to control operation of at least one device in the vehicle 100 during driving of the vehicle 100 in the generated driving route.

The driving control information may include control information required to control at least one of the User interface device 200, the object detection device 300, the communication device 400, the maneuvering device 500, or the vehicle drive device 600.

For example, the driving control information may include information indicating how much and in which direction to steer the vehicle 100, when the vehicle 100 reaches a spot in the driving route.

For example, the driving control information may include control information for controlling the vehicle drive device 600 to accelerate and/or decelerate the vehicle 100 in a section of the driving route.

For example, when the vehicle 100 reaches a spot in the driving route, the driving control information may include control information for controlling the User interface device 200 to display an input window through which to receive a user input.

The processor 870 may control the vehicle drive device 600 based on the generated driving route and driving control information so that the vehicle 100 may drive in the generated driving route.

The vehicle 100 may drive along the generated driving route in the manual mode or the autonomous driving mode.

The processor 870 may control operation of at least one device in the vehicle 100 based on the driving control information, while the vehicle 100 is driving in the driving route.

The processor 870 may update map data based on object information. The processor 870 may store the updated map data in the memory 140.

In some implementations, the processor 870 may update and store separate map data for different lanes, such as an up lane and a down lane, of the first geographic section based on the object information.

For example, if object information about a down lane is also collected during driving of the vehicle 100 in an up lane of the first geographic section, the processor 870 may update the map data based on the object information about the down lane in the first geographic section.

A driving route based on the updated map data may include a driving route based on the map data prior to the update.

The number of driving routes that may be generated based on the updated map data may be larger than the number of driving routes that may be generated based on the map data prior to the update.

The processor 870 may control the output unit 250 to display information based on the updated map data.

The power supply unit 890 may supply power needed for operation of each component under the control of the processor 870. Particularly, the power supply unit 890 may receive power from a battery inside the vehicle 100.

The power supply unit 890 may be the power supply unit 190. The power supply unit 890 may be provided in the operation system 700, separately from the power supply unit 190.

Figure 9A:
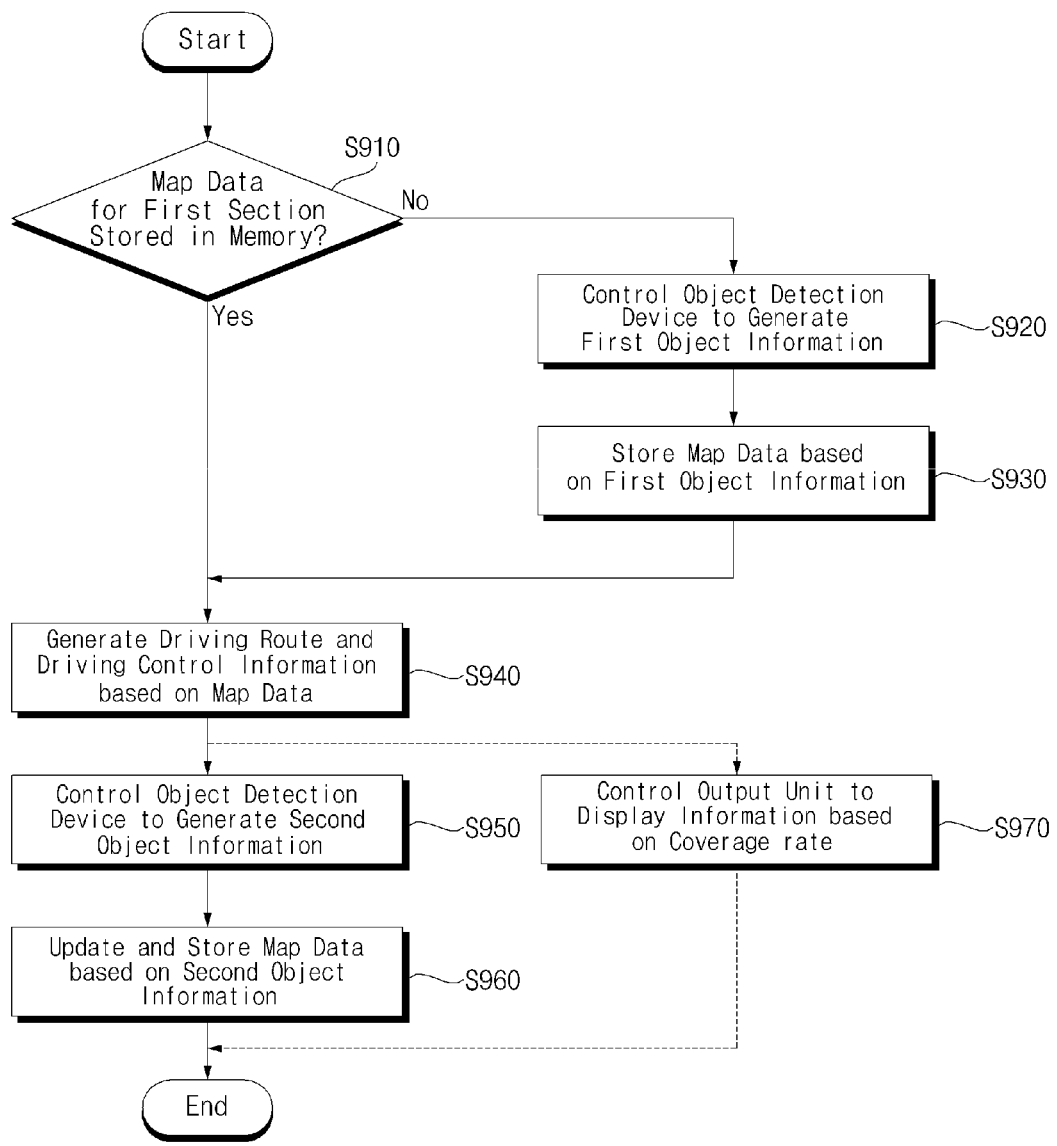
FIG. 9A is a flowchart illustrating an operation of the operation system according to an implementation of the present disclosure.

FIG. 9A is a flowchart illustrating an operation of the operation system according to an implementation of the present disclosure.

Referring to FIG. 9A, the processor 870 may determine whether map data for a first geographic section has been stored in the memory 140 (S910).

The processor 870 may determine whether there is map data including object location information and object shape information.

The map data may include information about a fixed object and/or a mobile object.

Based on determining the absence of the map data for the first geographic section, the processor 870 may control the object detection device 810 to generate first object information by monitoring the surroundings of the vehicle 100 driving according to a user-input-based control in the first geographic section (S920).

The processor 870 may determine whether the map data for the first geographic section has been stored in the memory by checking whether object information including location information corresponding to the first geographic section is included in map data.

In the case where object information is generated during driving of the vehicle 100 in a route and then object information is generated again during subsequent driving of the vehicle 100 in the same route, the object information generated during an earlier drive of the vehicle 100 is referred to herein as first object information, and the object information generated during the subsequent drive of the vehicle 100 is referred to herein as second object information.

If there map data has been stored for the first geographic section but the map data is insufficient to generate a driving route, then the processor 870 may also control the object detection device 810 to generate first object information by monitoring the surroundings of the vehicle 100 driving in the first geographic section.

The processor 870 may control the object detection device 810 to monitor the surroundings of the vehicle 100 that is driving in the manual mode set by the user.

The processor 870 may control the object detection device 810 to generate object information, while the vehicle 100 is driving in the semi-autonomous operating mode requiring some user manipulation of the maneuvering device 500.

The processor 870 may receive the first object information about an object in the first geographic section from a server, another vehicle, or a pedestrian through the communication device 400 of the vehicle 100.

The processor 870 may receive the first object information about the object in the first geographic section from a traffic information receiver through the communication device 400.

The processor 870 may control the communication device 400 to receive the first object information from a server (V2I), another vehicle (V2V), or a pedestrian (V2P).

The processor 870 may store map data based on the first object information (S930).

The processor 870 may generate map data by combining object information based on the first object information according to object location information. The processor 870 may store the generated map data in the memory 140.

The processor 870 may store map data which has been classified according to a preset time interval.

The preset time interval may be increased or decreased based on the stored map data by the processor 870.

For example, the processor 870 may classify and store map data for a rush-hour time zone and map data for other time zones, separately.

The processor 870 may store a plurality of map data sets according to a preset time interval.

For example, the processor 870 may separately store map data based on object information sensed during 7:00 AM to 9:00 AM and map data based on object information sensed during 9:00 AM to 12:00 AM.

The map data may include information about a traffic congestion degree of the first geographic section.

The processor 870 may classify and store map data including the information about the traffic congestion degree of the first geographic section, according to a preset time interval.

A traffic congestion degree may be defined as a ratio of an area occupied by vehicles on a road of a certain area or an index related to the ratio.

A plurality of traffic congestion levels may be defined according to a predetermined criterion.

The processor 870 may calculate the traffic congestion degree by substituting the area of the road and the number of vehicles in the first geographic section into a predetermined equation, based on the object information generated during driving of the vehicle 100 in the first geographic section.

The processor 870 may calculate the traffic congestion degree, using the average of the distances between the vehicle 100 and other adjacent vehicles, based on the object information generated during driving of the vehicle 100 in the first geographic section.

For example, if the average of the distances between the vehicle 100 and other adjacent vehicles is equal to or less than a predetermined value, the processor 870 may determine 'congested', and if the average of the distances between the vehicle 100 and other adjacent vehicles is larger than the predetermined value, the processor 870 may determine 'normal'.

The processor 870 may calculate the traffic congestion degree, using the average of the speeds of vehicles, based on the object information generated during driving of the vehicle 100 in the first geographic section.

The processor 870 may store a driver history along with map data.

The processor 870 may store a driver history including steering, acceleration, and deceleration of the vehicle 100.

The processor 870 may store a driver history including a history of executing one of the functions of the operation system 700.

The processor 870 may store different information in map data for a fixed object and map data for a mobile object.

For example, the processor 870 may store map data including fixed object location information and fixed object shape information.

For example, the processor 870 may store map data for a mobile object, including information about the number of mobile objects in the first geographic section, the type of a mobile object, information about the dynamics of a mobile object, and the average of the speeds of mobile objects in the first geographic section.

Once the map data has been generated and stored based on the object information, the processor 870 may generate a driving route and driving control information for driving in the first geographic section, based on the stored map data (S940).

A driving route may be a path along which the vehicle is to drive within a predetermined time. The driving route may include a distance and a time.

The processor 870 may generate driving control information specifying how to control a device provided in the vehicle 100 at various locations along the driving route.

The processor 870 may generate the driving control information in correspondence with the driving route.

For example, the processor 870 may control the vehicle drive device 600 in real time so that the vehicle 100 may drive along the driving route, and control the User interface device 200 to request an input to a user when the vehicle 100 reaches a location along the driving route.

For example, the processor 870 may control, based on the driving control information, the vehicle 100 to drive in the manual mode in a section of the driving route and in the autonomous driving mode in another section of the driving route.

The processor 870 may generate a driving route and driving control information based on map data including a driver history in a driver-preferred manner.

For example, if determining that the number of lane changes that the driver has made in a predetermined section is less than a predetermined value, the processor 870 may generate a driving route that minimizes lane changes in the section.

For example, if a driver history of driving in the autonomous driving mode in a predetermined section has been stored, the processor 870 may execute the autonomous driving mode when the vehicle 100 drives again in the section.

The processor 870 may control the vehicle 100 based on a driver history.

For example, in the presence of a history of driving in the autonomous driving mode in a specific section of a driving route, the processor 870 may execute the autonomous driving mode in the specific section upon receipt of a user input or automatically.

For example, in the presence of a driver history of using an Autonomous Cruise Control (ACC) function in a specific section of a route, the processor 870 may execute the ACC function in the specific section upon receipt of a user input or automatically.

After generating the driving route and the driving control information based on the map data, the vehicle 100 may be controlled to drive along the generated driving route based on the driving control information.

During this time, the processor 870 may control the object detection device 810 to generate second object information about the surroundings of the vehicle 100 that is driving along the driving route (S950).

While driving along the driving route, the vehicle 100 may again drive through the first geographic section through which the vehicle 100 drove when generating the first object information.

In this scenario, the processor 870 may receive second object information about an object in the first geographic section from at least one of a server, another vehicle, or a pedestrian through the communication device 400.

The processor 870 may update the map data based on the second object information that was generated during this subsequent drive through the first geographic section. The processor 870 may store the updated map data in the memory 140 (S960).

Based on determining that the second object information does not include any part that is different from the already-stored map data, the processor 870 may not store the second object information.

The processor 870 may determine whether there is any part of the second object information that matches (e.g., is identical or sufficiently corresponds) to the map data by comparing the second object information with the stored map data.

The step for updating and storing map data (S960) will be described below in greater detail with reference to FIG. 9B.

In some implementations, the processor 870 may determine how much (e.g., what ratio) of a total road area in a first geographic section has been sensed as object information. In some implementations, if a particular geographic section has had a relatively sparse amount of object information generated for that section, then the processor 870 may determine that insufficient object information is available to safely perform autonomous driving in that section.

As an example, a coverage rate may be defined that indicates a size of a first geographic area for which object information has been stored relative to a size of a second geographic area for which object information has not been stored. The coverage rate may be defined using any suitable technique that includes, either explicitly or implicitly, the above two quantities.

For example, the coverage rate may be defined as a ratio of an area of a geographic section or route for which object information has been generated to a total area of that section or route.

The processor 870 may control the output unit 250 to display information based on a coverage rate (S970).

The information based on the coverage rate may include a result of a determination made based on the coverage rate as well as the coverage rate itself.

For example, the processor 870 may control the display unit 251 to display a graphic object representing the vehicle 100 and/or the driving route.

For example, the processor 870 may control the display unit 251 to display a graphic object representing a driving direction of the vehicle 100 and/or a section of the driving route.

For example, the processor 870 may control the display unit 251 to display a driving mode determined based on the coverage rate.

Figure 9B:
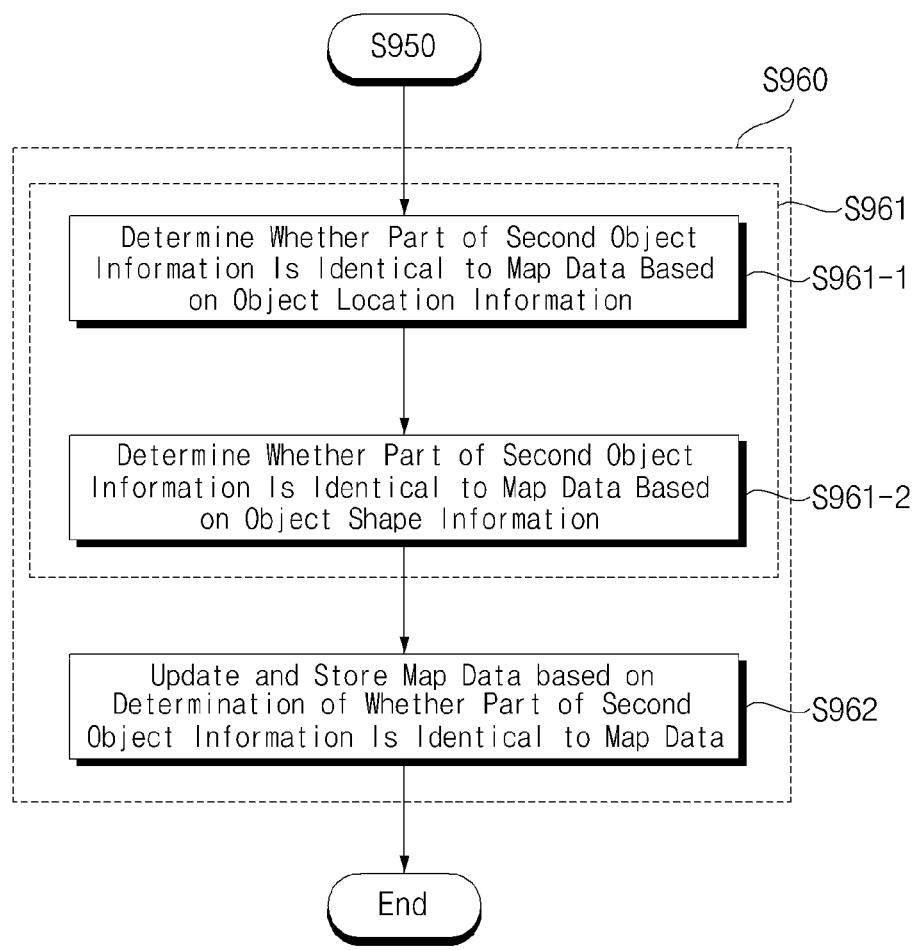
FIG. 9B is a flowchart illustrating a step for updating and storing map data (S960) illustrated in FIG. 9A.

FIG. 9B is a flowchart illustrating the step for updating and storing map data (S960) illustrated in FIG. 9A.

The processor 870 may determine whether there is any part identical to the map data in the second object information by comparing the second object information with the map data (S961).

For example, the processor 870 may store a part of the second object information determined to be different from the map data in the map data.

The processor 870 may compare information stored in the second object information with information stored in the map data, for a specific object.

The processor 870 may determine whether there is any part that matches to the map data in the second object information by comparing the second object information with the map data, based on object location information (S961-1).

If determining based on the object location information that there is no part that matches to the map data in the second object information, the processor 870 may store the second object information.

For example, the processor 870 may store, in the map data, a part of the second object information determined to be different from the map data based on the object location information.

If determining based on the shape location information that at least a part of the second object information is that matches to the map data, the processor 870 may determine based on object shape information whether at least a part of the second object information matches to the map data by comparing at least a part of the second object information with the map data (S961-2).

For example, the processor 870 may store, in the map data, at least a part of the second object information determined to match the map data in terms of object location information but different from the map data in terms of object shape information.

The processor 870 may update and store the map data based on a result of the determination as to whether there is any part of the second object information that matches to the map data (S962).

The processor 870 may update and store map data classified according to a predetermined time interval.

The processor 870 may control the predetermined time interval based on the stored map data.

For example, the processor 870 may update and store map data for a rush-hour time zone and map data for other time zones, separately.

For example, if determining that map data for 7:00 AM to 8:00 AM is similar to map data for 8:00 AM to 9:00 AM, the processor 870 may update and store map data for 7:00 AM to 9:00 AM. In this case, when the processor 870 generates a driving route for the time zone of 7:00 AM to 9:00 AM, the processor 870 may generate the driving route based on the map data for 7:00 AM to 9:00 AM.

The processor 870 may update and store map data including information about traffic congestion degrees of the first geographic section by classifying the map data according to a predetermined time interval.

The processor 870 may update and store map data including a driver history in the first geographic section.

The processor 870 may update and store a driver history including steering, acceleration, and deceleration of the vehicle 100.

The processor 870 may update and store a driver history including a history of executing one of the functions of the operation system 700.

The processor 870 may update and store different information in map data for a fixed object and map data for a mobile object.

For example, the processor 870 may store map data for a fixed object, including object location information and object shape information.

For example, the processor 870 may store map data for a mobile object, including information about the number of mobile objects in a specific section, the type of a mobile object, information about the dynamics of a mobile object, and the average of the speeds of mobile objects in the specific section.

Figure 9C:
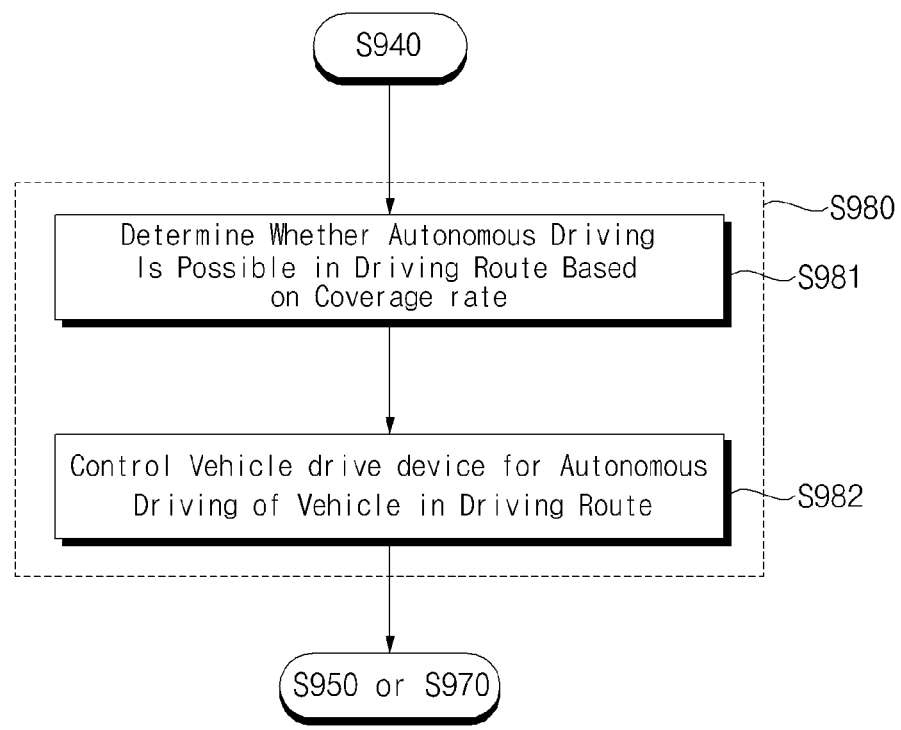
FIG. 9C is a flowchart illustrating a step for controlling a vehicle drive device (S980) illustrated in FIG. 9A.

FIG. 9C is a flowchart illustrating the step for controlling the vehicle drive device (S980).

The processor 870 may control the vehicle drive device 600 based on the generated driving route and driving control information so that the vehicle 100 may drive in the generated driving route (S980).

The processor 870 may control at least one device provided in the vehicle 100 according to the driving control information so that the vehicle 100 may drive in the generated driving route.

The processor 870 may control the vehicle drive device 600 further based on the second object information so that the vehicle 100 may autonomously drive in the driving route.

For example, the processor 870 may modify a part of the driving route based on the second object information detected during driving along the driving route generated based on the map data. Thus, the processor 870 may optimize the driving route in real time.

For example, the processor 870 may generate a driving route based on the map data and mobile object information included in the second object information.

For example, if the vehicle 100 is driving in a route based on information of the second object information, not included in the map data, the processor 870 may control the vehicle drive device 600 so that the vehicle 100 may drive slower than in a route based on information included in the map data.

For example, in the case where the vehicle 100 is driving in a section of a driving route based on sensed object information without stored map data, the processor 870 may control the vehicle drive device 600 so that the vehicle 100 may drive slower than in the same section of a driving route based on map data generated after the driving in the section.

As the processor 870 differentiates the speed of the vehicle 100 depending on the presence or absence of map data in this manner, the processor 870 may enable the vehicle 100 to drive, while effectively monitoring objects around the vehicle 100, and increase driving safety.

In some implementations, the processor 870 may determine whether autonomous driving may be safely performed in a particular geographic section or route by determining an amount of object information that is available for that section or route. For example, the processor 870 may determine a coverage rate for a driving route and, based on the coverage rate, determine whether the driving route is available for autonomous driving (S981).

The processor 870 may determine a coverage rate based on map data. The coverage rate may be defined as a ratio of an area covered by stored object information to a total area of a road in a driving route. The coverage rate may be determined based on the stored map data by the processor 870.

To determine the coverage rate, the total area of the road in the driving route including an area sensed by a sensor should be known.

The processor 870 may estimate the total area of the road based on object information.

For example, the processor 870 may estimate the overall shape of the road in the driving route based on object information about a part of the road in the driving route.

For example, if only a part of a boundary line of a road is sensed because the road is hidden by an object such as another vehicle, the processor 870 may calculate the total area of the road in the driving route by estimating the hidden part of the road by the object such as another vehicle by a predetermined algorithm.

For example, if one point and the other point of the boundary line of the road are sensed but the boundary line between the points is not sensed, the processor 870 may determine the boundary line of the road, on the assumption that the boundary line of the road is continuous from the one point to the other point.

The processor 870 may determine the total area of the road based on pre-stored information.

The processor 870 may receive information about the total area of the road from the navigation system 770.

The processor 870 may calculate the ratio of the area covered by the stored object information to the total area of the road in the driving route, while generating the driving route based on the map data.

If the coverage rate of the generated driving route is equal to or greater than a predetermined value, the processor 870 may determine that autonomous driving is possible in the generated driving route. For example, autonomous driving is possible based on a determination that autonomous driving can be performed in a safe manner based on knowledge of the vehicle surroundings.

The processor 870 may determine an available driving mode from among a plurality of driving modes including at least two of manned autonomous driving, unmanned autonomous driving, and manual driving, based on the coverage rate.

The plurality of driving modes may include an unmanned autonomous driving mode, a manned autonomous driving mode requiring a driver aboard, a manned autonomous driving mode requiring match between the gaze of a driver and a driving direction, and a manual driving mode.

If the coverage rate falls within a predetermined range, the processor 870 may determine an available driving mode based on pre-stored information.

For example, the processor 870 may determine that the autonomous driving mode requiring match between the gaze of a driver and a driving direction, and the manual driving mode are available in a section with a coverage rate of 70 to 80%.

For example, the processor 870 may determine that the unmanned autonomous driving mode, the manned autonomous driving mode, and the manual driving mode are available in a section with a coverage rate of 90 to 100%.

The processor 870 may divide a driving route into a plurality of sections according to coverage rates, and determine whether autonomous driving is possible in each individual section.

The processor 870 may determine an available one of a plurality of driving modes for each of the plurality of sections based on the coverage rates.

The processor 870 may determine a park-out path for autonomous driving based on a coverage rate.

A driving route may be defined as a route including a park-out path.

The park-out path may be a path in which a vehicle parked in a parking space leaves the parking space and travels to a spot.

The processor 870 may determine a section with a coverage rate kept at a predetermined value or above from a spot at which the vehicle has been parked to a certain spot to be a park-out available section in the driving route, based on the coverage rate.

The processor 870 may set the parked spot of the vehicle 100 to a spot with a coverage rate maintained to be a predetermined value or above as a park-out path. Thus, the processor 870 may determine an autonomous park-out available section from the parked spot of the vehicle 100 based on the coverage rate.

The processor 870 may determine a park-in path available for autonomous driving based on a coverage rate.

A driving route may be defined as a route including a park-in path.

The park-in path may be a path in which a vehicle travels from a spot outside a parking space to a spot available for parking.

The processor 870 may determine a section with a coverage rate maintained to be a predetermined value or above, spanning from one spot to a spot for parking in the driving route, to be an autonomous park-in available section.

If the coverage rate of a section spanning from one spot to a spot for parking of the vehicle 100 in the driving route is maintained to be or above a predetermined value, the processor 870 may set the path from the one spot to the spot for parking to be a park-in path. In this manner, the processor 870 may determine an autonomous park-in available section ending in the parking spot of the vehicle 100 based on a coverage rate.

The processor 870 may control the vehicle drive device 600 based on a result of the determination as to whether autonomous driving is possible in the driving route, so that the vehicle 100 may drive autonomously in the driving route (S982).

If determining that autonomous driving is possible in the park-out path, the processor 870 may control the vehicle drive device 600 so that the vehicle 100 may autonomously drive in the park-out path.

The processor 870 may control the vehicle drive device 600 so that the vehicle 100 may stop after driving in the set park-out path.

Since the operation system 700 having the above-described configuration updates map data, a park-out path is updated and autonomous park-out is possible, thereby increasing the convenience of the driver.

If determining that autonomous driving is possible in the park-in path, the processor 870 may control the vehicle drive device 600 so that the vehicle 100 may autonomously drive in the park-in path.

Since the operation system 700 having the above-described configuration updates map data, a park-in path is updated and autonomous park-in is possible, thereby increasing the convenience of the driver and improving a route based on learning without additional manual update.

Figure 10A:
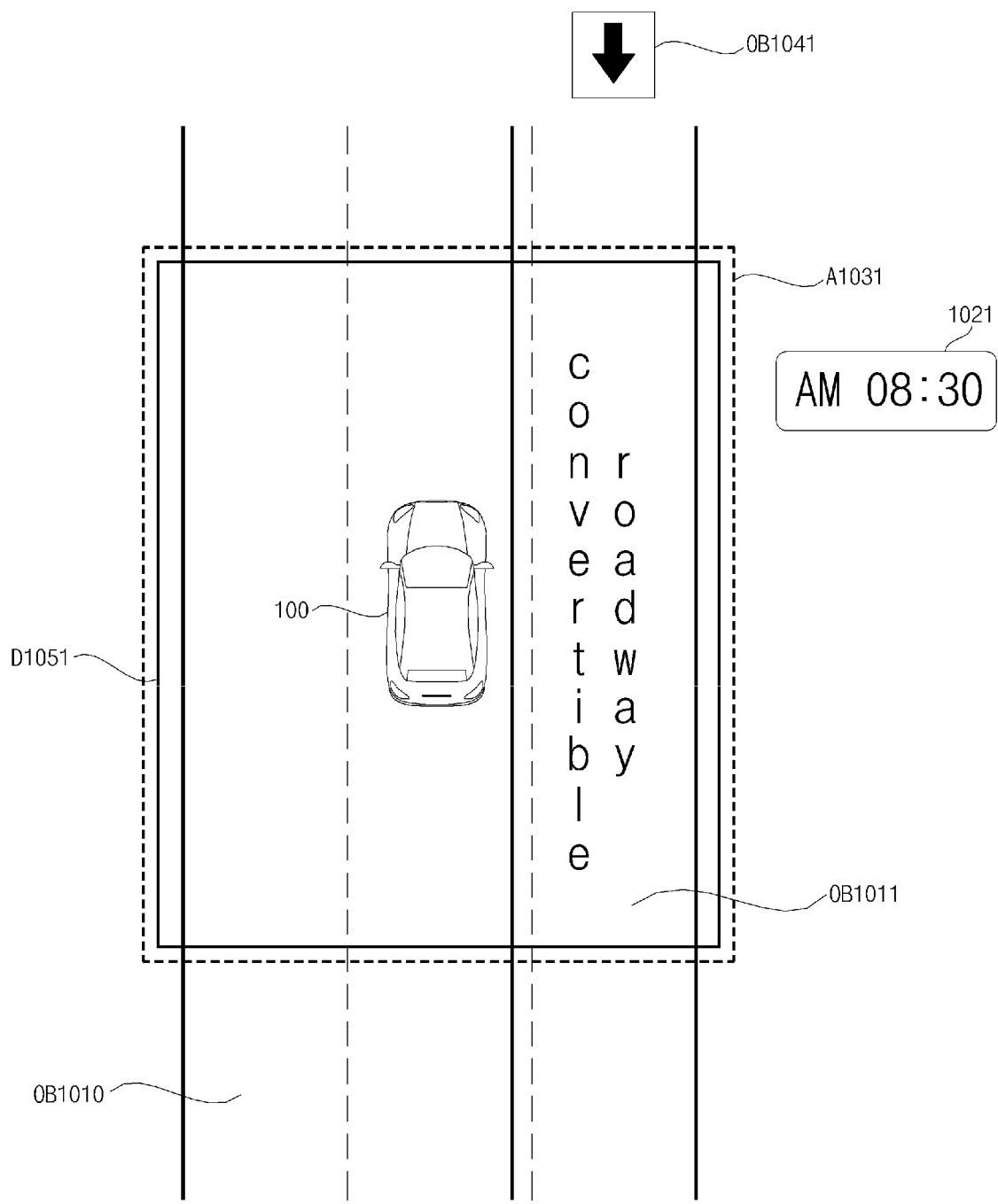
FIGS. 10A to 15 are views referred to for describing the operation system according to an implementation of the present disclosure.
Figure 10B:
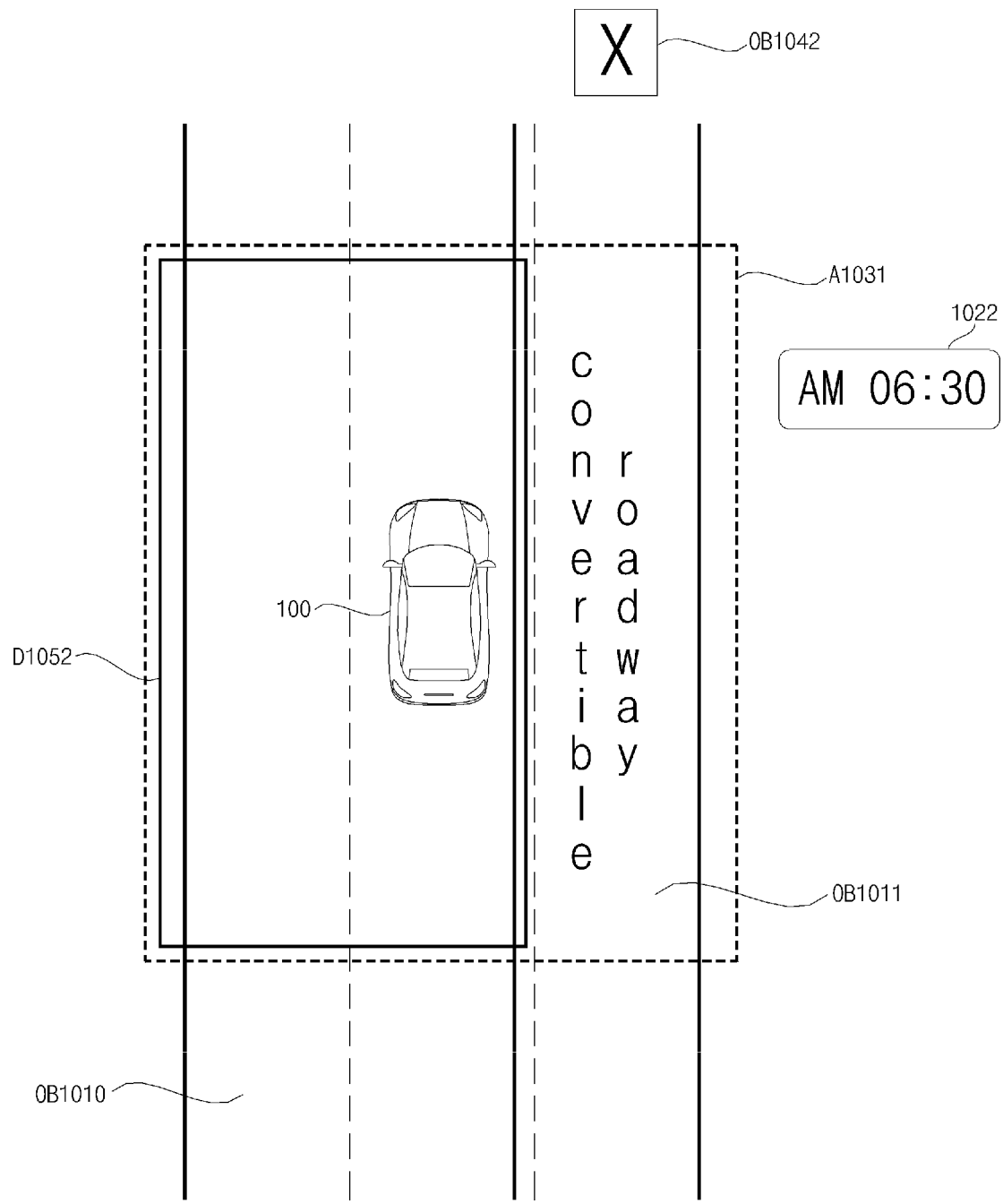

FIGS. 10A and 10B are views referred to for describing an operation system according to an implementation of the present disclosure.

The processor 870 may control the object detection device 810 to generate object information about the surroundings of the vehicle 100 during driving of the vehicle 100.

The processor 870 may store map data based on the object information.

The processor 870 may store the map data by classifying the map data according to a predetermined time interval.

For example, the processor 870 may store map data for a first time zone based on object information sensed in the first time zone, according to a predetermined time interval.

The processor 870 may sense objects during driving in a driving route generated based on the stored map data, and update the pre-stored map data based on information about the sensed objects. The processor 870 may store the updated map data in the memory 140.

The processor 870 may update and store the map data classified according to the predetermined time interval.

FIG. 10A is a view illustrating driving of the vehicle 100 on the road OB1010 at a time 1021 in a rush-hour time zone.

The road OB1010 includes a convertible lane OB1011 available or unavailable for vehicle driving according to time zones.

The processor 870 may determine that the vehicle 100 may drive in the convertible lane OB1011 by recognizing a signal lamp OB1041 indicating driving available.

The processor 870 may control the object detection device 810 to sense objects around the vehicle 100. The object detection device 810 may sense objects within a predetermined area A1031 around the vehicle 100.

The processor 870 may generate map data D1051 for the rush-hour time zone based on information about the sensed objects.

FIG. 10B is a view illustrating driving of the vehicle 100 on the road OB1010 at a time 1022 of a non-rush hour time zone.

The driver may confirm that the driver cannot drive in the convertible lane OB1011 from a signal lamp OB1042 indicating driving unavailable.

The processor 870 may control the object detection device 810 to sense objects around the vehicle 100. Herein, the object detection device 810 may sense objects within the predetermined area A1031 around the vehicle 100.

The processor 870 may generate map data D1052 for the non-rush hour time zone based on information about the sensed objects. In this case, the processor 870 may generate map data except for the convertible lane OB1011 unavailable for driving in the corresponding time zone.

The thus-constituted operation system 700 may advantageously generate a driving route according to a road situation changing according to time zones.

Figure 11A:
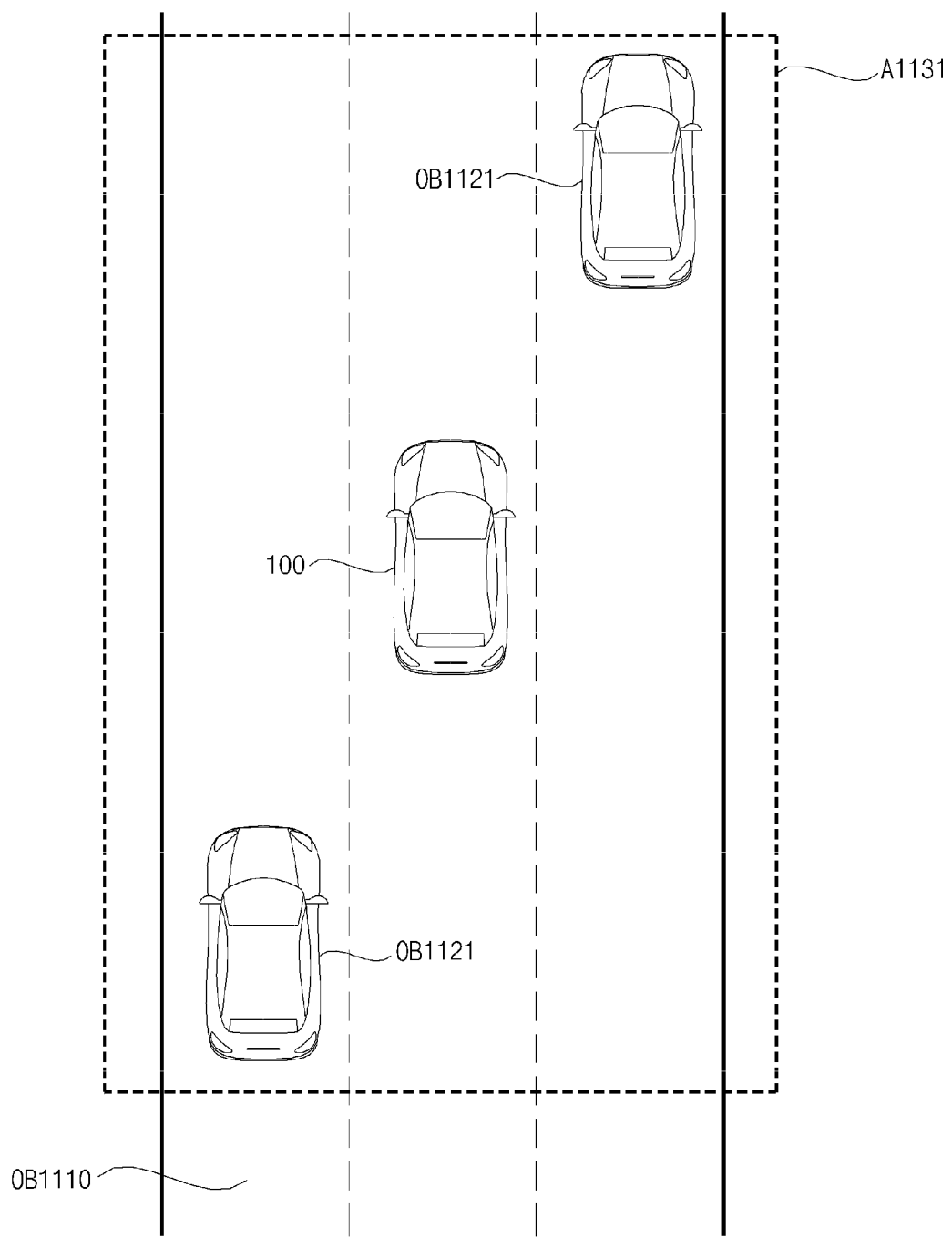
Figure 11B:
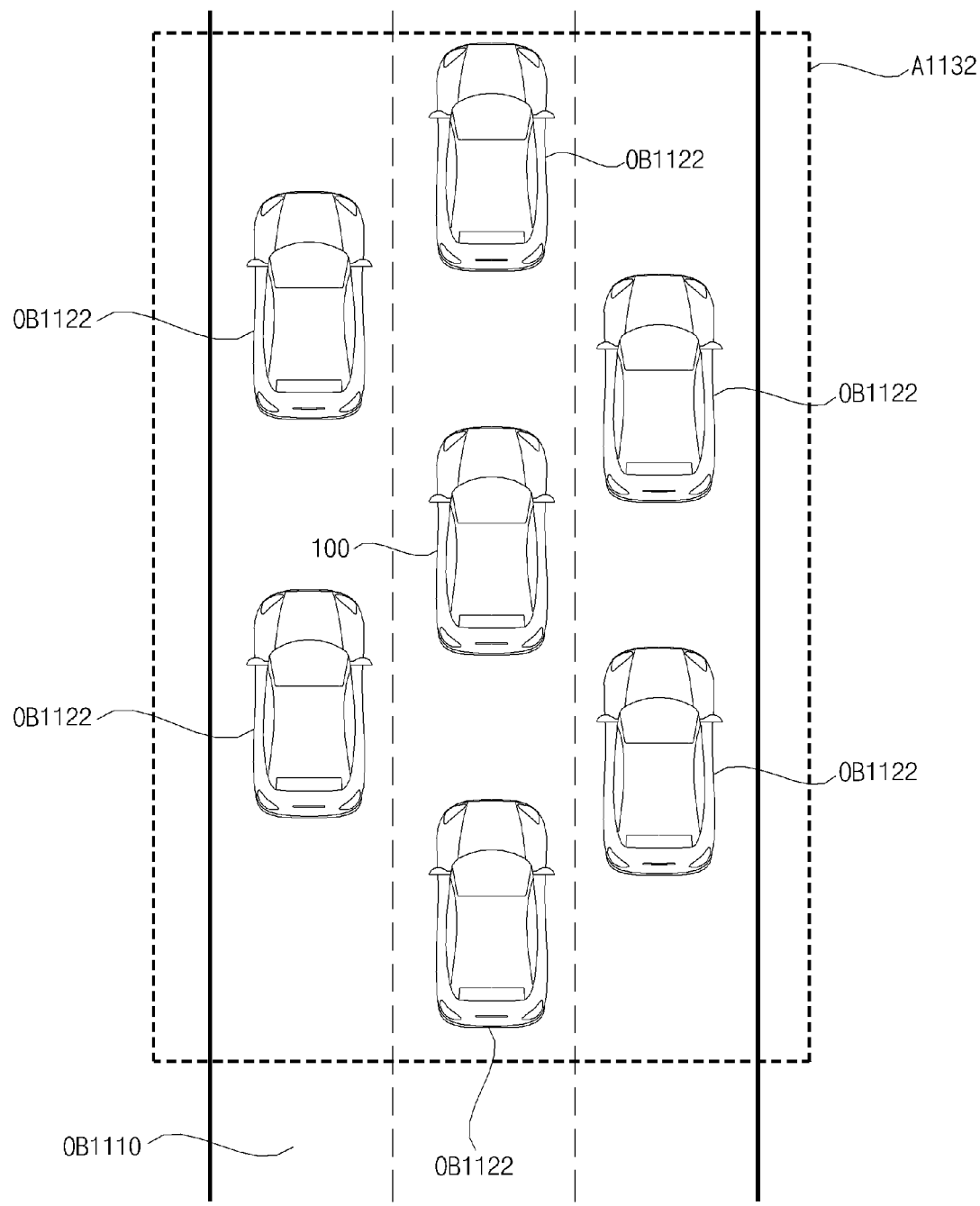

FIGS. 11A and 11B are views referred to for describing an operation system according to an implementation of the present disclosure.

The processor 870 may control the object detection device 810 to generate object information about the surroundings of the vehicle 100 during driving of the vehicle 100.

The processor 870 may store map data based on the object information.

The processor 870 may store map data classified according to a predetermined time interval.

The processor 870 may store the map data by classifying traffic congestion degrees of a specific section according to a predetermined time interval.

A traffic congestion degree may be defined as a ratio of an area occupied by vehicles on a road of a certain area or an index related to the ratio.

A plurality of traffic congestion levels may be defined according to a predetermined criterion.

The processor 870 may calculate the traffic congestion degree by substituting the area of the road and the number of vehicles in the first geographic section into a predetermined equation, based on the object information generated during driving of the vehicle 100 in the first geographic section.

The processor 870 may calculate the traffic congestion degree, using the average of the distances between the vehicle 100 and other adjacent vehicles, based on the object information generated during driving of the vehicle 100 in the first geographic section.

For example, if the average of the distances between the vehicle 100 and other adjacent vehicles is equal to or less than a predetermined value, the processor 870 may determine 'congested', and if the average of the distances between the vehicle 100 and other adjacent vehicles is larger than the predetermined value, the processor 870 may determine 'normal'.

The processor 870 may calculate the traffic congestion degree, using the average of the speeds of one or more vehicles driving in the first geographic section, based on the object information generated during driving of the vehicle 100 in the first section.

The processor 870 may update pre-stored map data based on generated new object information. The processor 870 may store the updated map data in the memory 140.

The processor 870 may update and store the map data classified according to the predetermined time interval.

The processor 870 may update the map data which has been stored by classifying the traffic congestion degrees of the specific section according to the predetermined time interval.

Referring to FIG. 11A, the processor 870 may control the object detection device 810 to generate object information about the surroundings of the vehicle 100, during driving of the vehicle 100 on a road OB1110.

The processor 870 may generate map data based on the object information.

The processor 870 may update and store map data for a time zone in which objects are sensed, based on the object information.

As illustrated in FIG. 11A, the processor 870 may calculate an index related to a traffic congestion degree by substituting the value of an area occupied by the vehicles 100 and OB1121 driving on the road OB1110 and the value of an area of the road OB1110 in a predetermined section A1131 into a predetermined equation.

For example, a road occupancy rate of vehicles may be calculated by the equation:

$$\text{road occupancy rate of vehicles} = \frac{\text{(area occupied by vehicles on road)}}{\text{(area of road)}}$$

If the road occupancy rate is less than a predetermined value, the processor 870 may determine the traffic congestion degree to be 'low'.

The processor 870 may store information about the traffic congestion degree of the predetermined section A1131 in the map data.

Referring to FIG. 11B, the processor 870 may calculate an index related to a traffic congestion degree by substituting an area occupied by the vehicles 100 and OB1121 driving on the road OB1110 and an area of the road OB1110 in a predetermined section A1132 into a predetermined equation.

For example, if the road occupancy rate of vehicles on the road is equal to or greater than a predetermined value, the processor 870 may determine the traffic congestion degree to be 'high'.

The processor 870 may store information about the traffic congestion degree of the predetermined section A1132 in the map data.

Figure 12A:
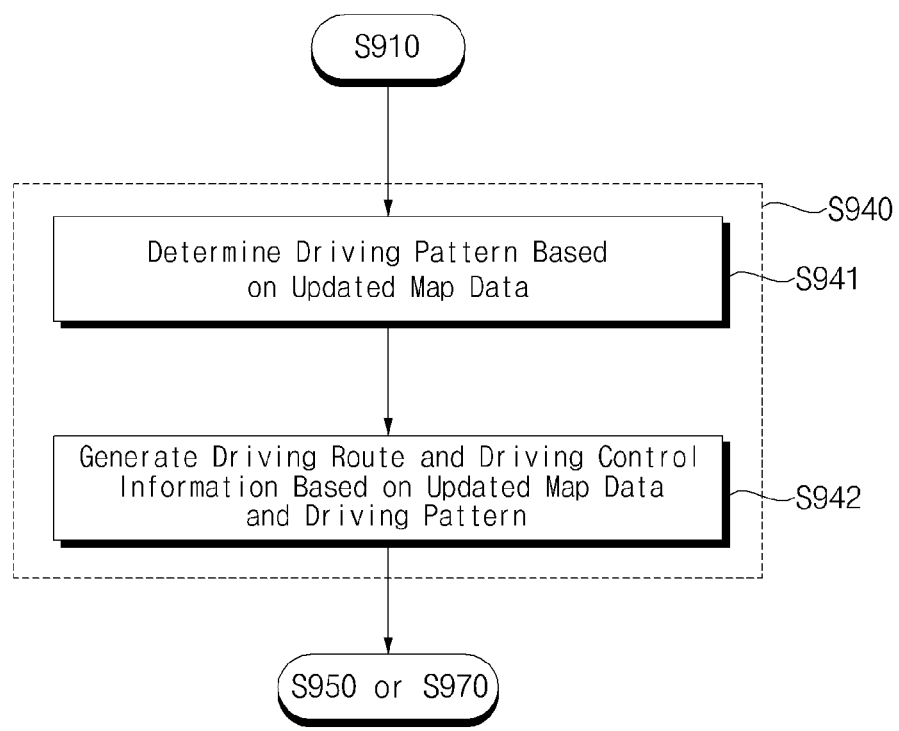
Figure 12B:
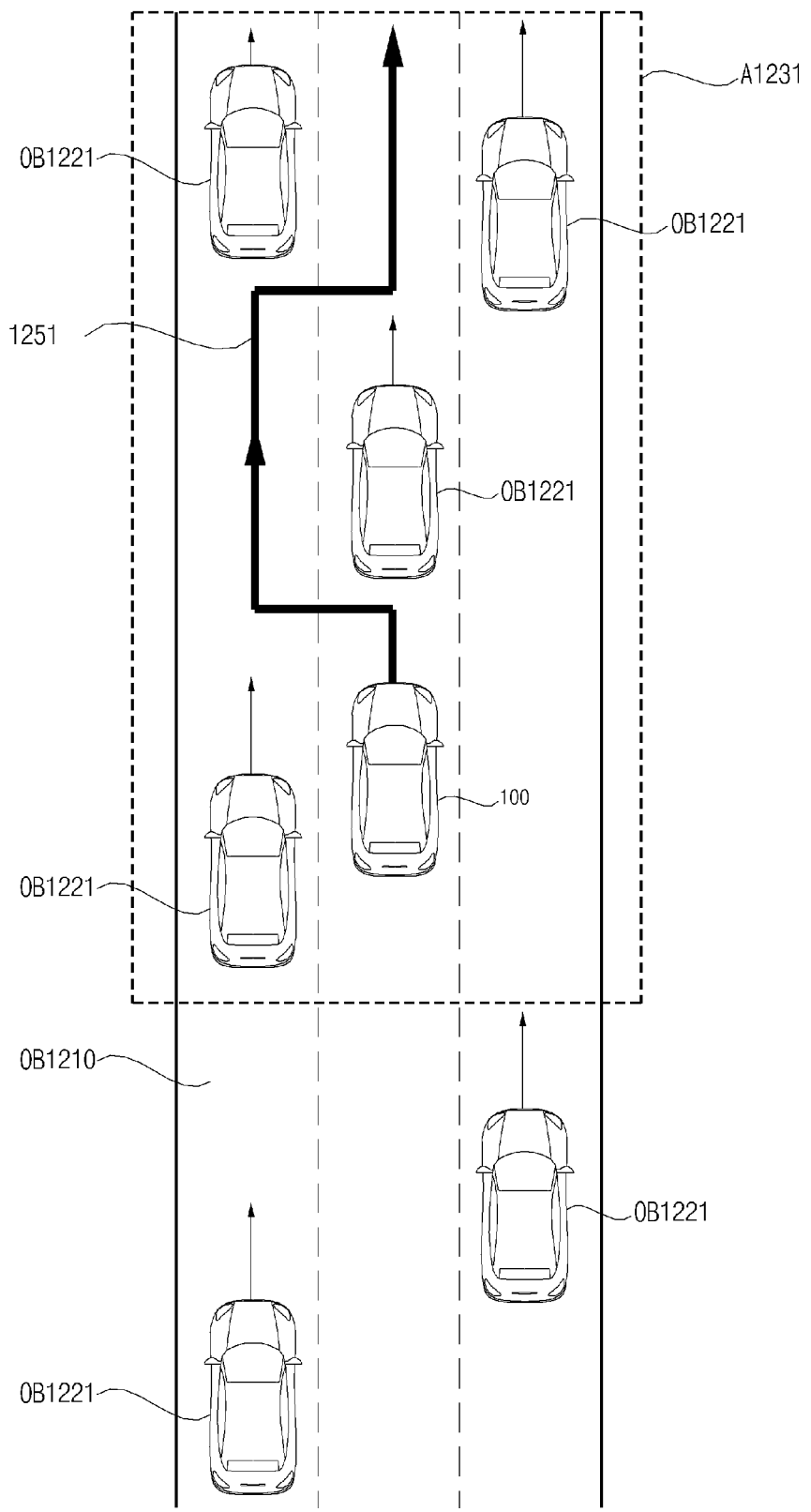
Figure 12C:
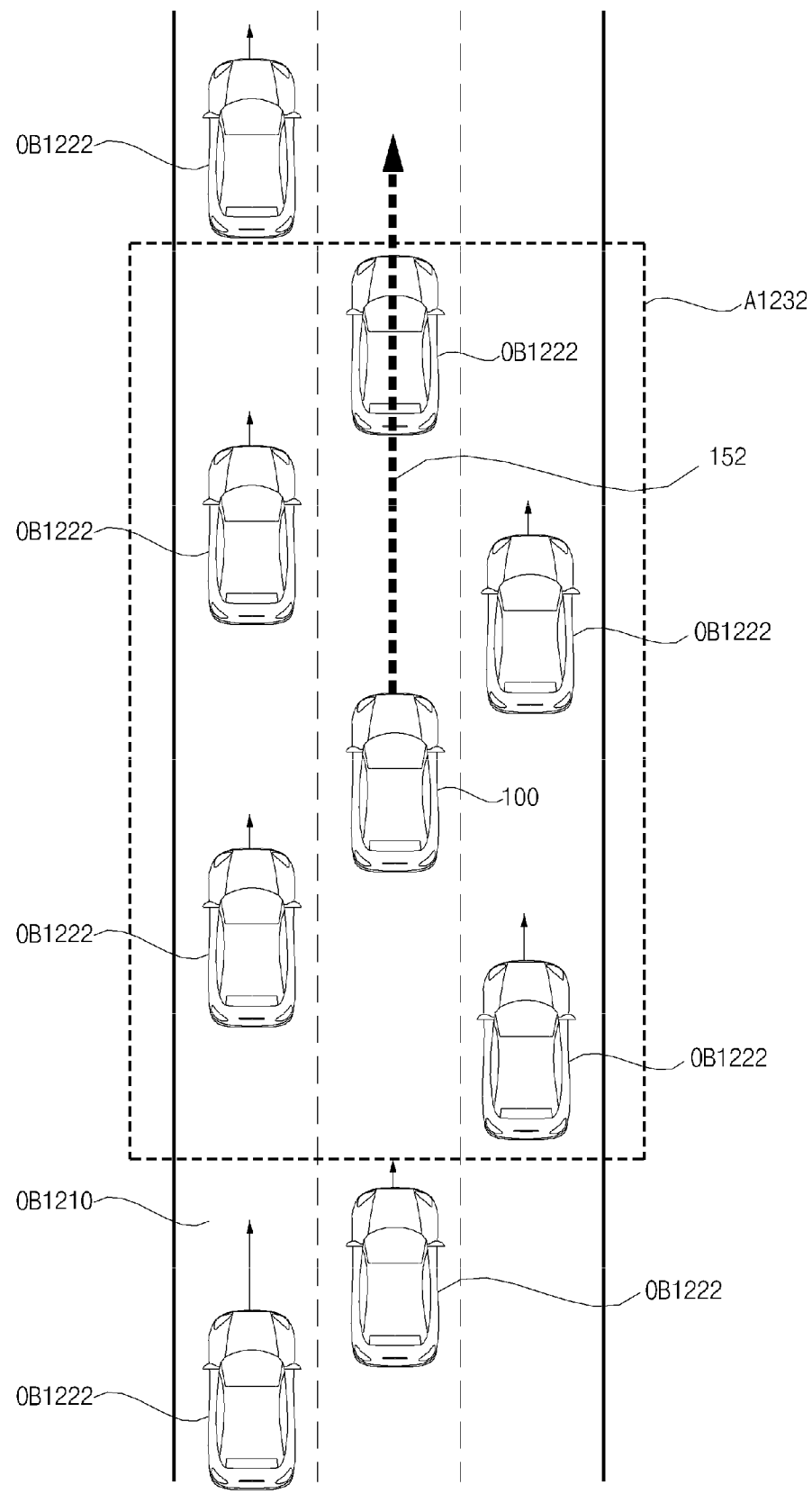

FIGS. 12A, 12B, and 12C are views referred to for describing an operation system according to an implementation of the present disclosure.

Referring to FIG. 12A, the processor 870 may determine a driving pattern including lane changes based on the updated map data (S941).

The processor 870 may determine a driving pattern based on the updated map data including the traffic congestion degrees of the first geographic section and classified according to a predetermined time interval.

The driving pattern may include a lane change, a vehicle's increased or decreased speed, a steering angle during vehicle steering, and so on.

The driving pattern may include a driving pattern in which lanes are freely changed, and a driving pattern in which lane changes are minimized.

The processor 870 may generate a driving route and driving control information based on the updated map data and the driving pattern (S942).

The processor 870 may generate a driving route and driving control information for driving in the first geographic section, based on the map data including the traffic congestion degree of the first geographic section.

For example, if the operation system 700 of the vehicle 100 generates a driving route in which a lane may be changed freely in a section with a high traffic congestion degree without considering the traffic congestion degree, a driving time may not be shortened and a traffic flow of a road may get slow. Particularly, if the operation systems of other vehicles as well as that of the vehicle 100 generates a driving route without considering a traffic congestion degree by the same algorithm, the traffic flow of the road may be slow.

For example, if determining that the traffic congestion degree of a section in a specific time zone is equal to or greater than a predetermined value, the processor 870 may generate a driving route and driving control information in a driving pattern that minimizes the number of lane changes.

The processor 870 may generate a driving route and driving control information based on map data which has been generated by classifying the traffic congestion degrees of a specific section according to a predetermined time interval.

Referring to FIG. 12B, when generating a driving route for the vehicle 100 driving along with other vehicles OB1221 on a road OB1210, if determining that the traffic congestion degree of a route in which the vehicle 100 will drive in a corresponding time zone is 'low', the processor 870 may set a driving pattern that changes lanes freely.

The processor 870 may generate a driving route 125 in which the vehicle 100 may pass other vehicles OB1221, changing lanes, based on map data and the driving pattern.

Referring to FIG. 12C, when generating a driving route for the vehicle 100 driving along with other vehicles OB1222 on the road OB1210, if determining that the traffic congestion degree of a route in which the vehicle 100 will drive in a corresponding time zone is 'high', the processor 870 may set a driving pattern that minimizes lane changes.

The processor 870 may generate a driving route 1252 in which the vehicle 100 is supposed to maintain a driving lane, based on map data and the driving pattern.

Since the operation system 700 having the above configuration generates a driving route in consideration of a traffic situation of a road, the operation system 700 enables a smooth traffic flow and eventually, shortens the driving time of the vehicle 100.

Further, the operation system 700 may increase driving safety by generating a safe driving route.

FIGS. 13A to 13F are views referred to for describing an operation system according to an implementation of the present disclosure.

Figure 13A:
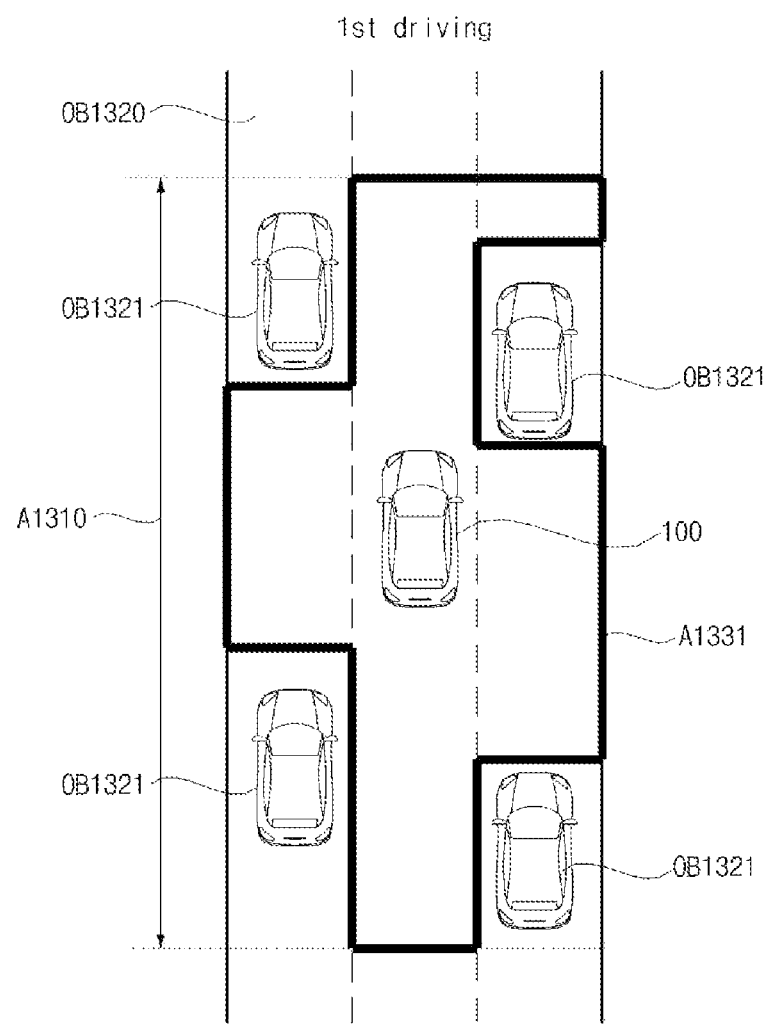

Referring to FIG. 13A, the processor 870 may control the object detection device 810 to generate first object information D1341 about the surroundings of the vehicle 100, while driving in a new first section A1310 in response to a user input.

Figure 13B:
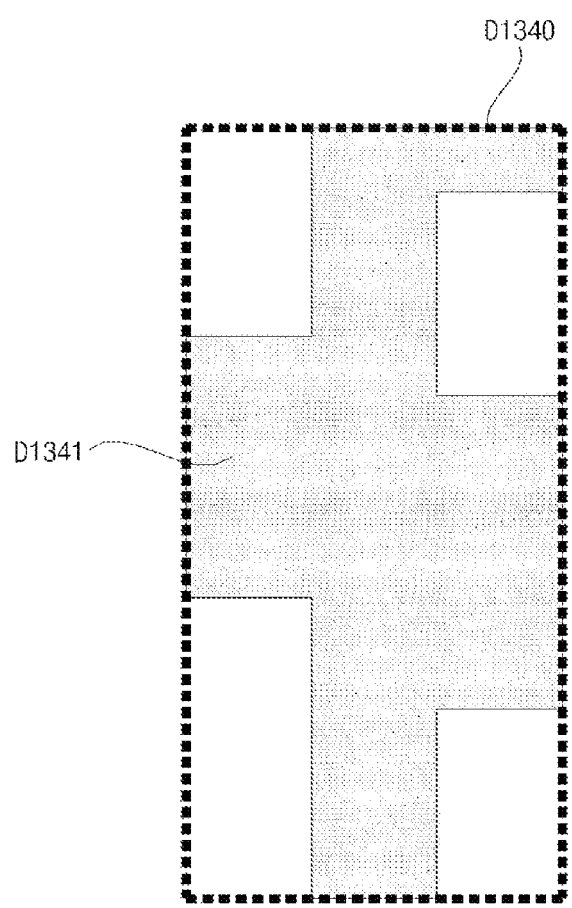

Referring to FIG. 13B, the processor 870 may store map data D1340 based on the first object information D1341 obtained by sensing the area of a road OB1320 in the object detection device 810. The first object information D1341 may be information about a partial area of the road OB1320 except for an area that has not been sensed due to other vehicles OB1321.

The map data D1340 may also include information about an area that has not been sensed by the object detection device 810. The processor 870 may store a value obtained by estimating the area not sensed due to the other vehicles OB1321 based on the first object information D1341 by a predetermined algorithm in the map data D1340.

For example, if information about a part of a median strip on the road OB1320 is not included in the first object information, the processor 870 may store, in the map data D1340, information obtained by calculating the location and shape of the non-sensed median strip based on information included in the first object information.

For example, the map data D1340 may include the total area of the road OB1320 in the first section A1310.

The processor 870 may store a coverage rate being a ratio of the area covered by the stored object information to the total area of the road OB1320 in the first section A1310 in the map data D1340.

Figure 13C:
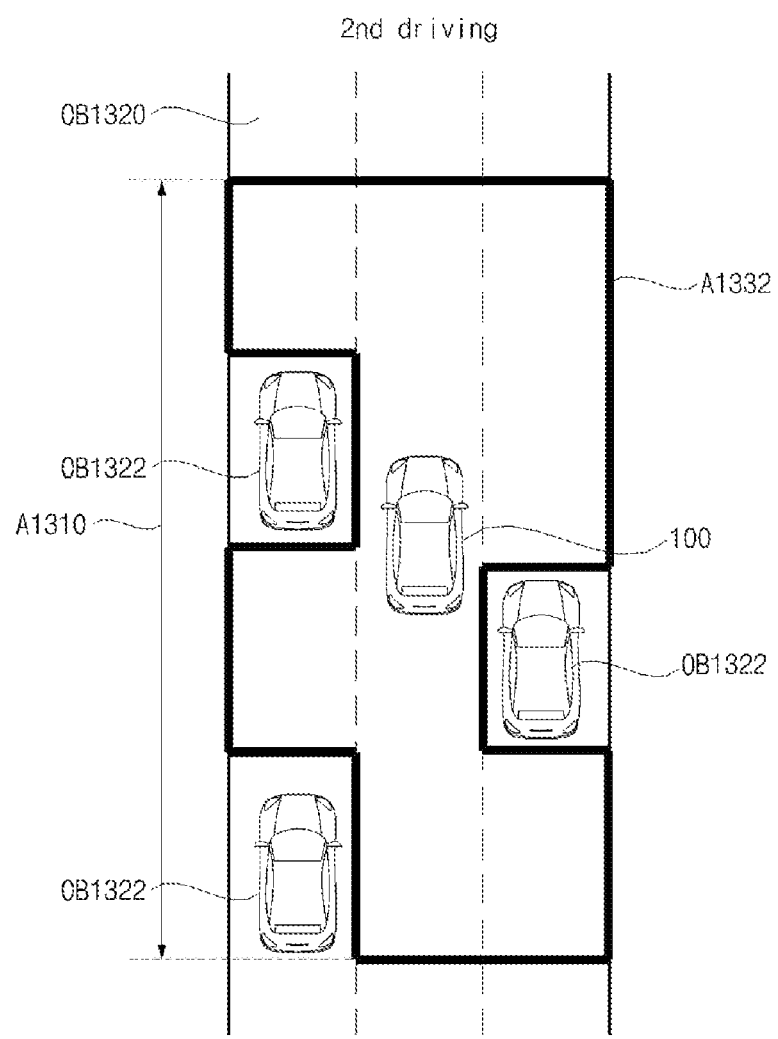

Referring to FIG. 13C, the processor 870 may generate a driving route and driving control information based on the stored map data D1340. The processor 870 may control the object detection device 810 to generate second object information about the surroundings of the vehicle 100, while driving again in the first section A1310 based on the generated driving route and driving control information.

The processor 870 may update and store the map data D1340 based on the sensed second object information.

The processor 870 may determine whether to store the second object information by comparing the second object information with the map data D1340.

The processor 870 may determine whether there is any part of the second object information that matches the map data D1340 by comparing the second object information with the map data D1340, in terms of object location information, and store the second object information based on a result of the determination.

For example, if determining that at least a part of the second object information matches the map data D1340 based on object location information, the processor 870 may determine based on object shape information whether there is any part of the second object information that matches to the map data D1340 by comparing at least a part of the second object information with the map data D1340.

Figure 13D:
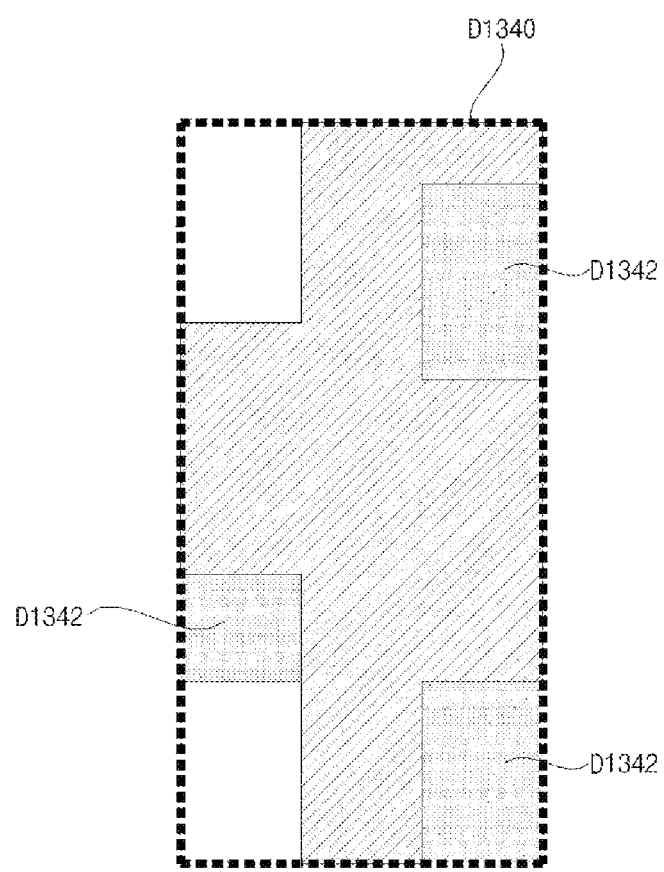

As illustrated in FIG. 13D, the processor 870 may determine second object information D1342 which has not been stored in the map data D1340.

The processor 870 may update the second object information D1342 determined to be new information, and store the updated second object information.

The processor 870 may calculate a coverage rate by substituting the total area of a road in the first section A1310 and an area of the road covered by object information stored in the updated map data D1340 into a predetermined equation. The processor 870 may update and store the calculated coverage rate in the map data D1340.

Figure 13E:
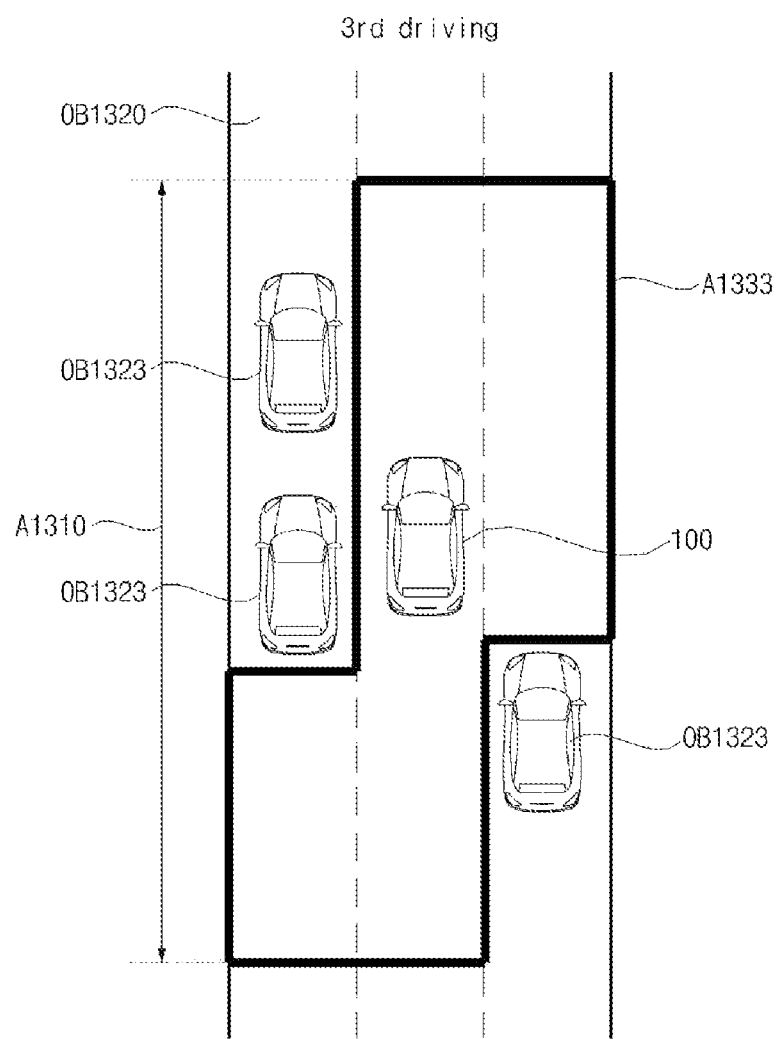

Referring to FIG. 13E, the processor 870 may generate a driving route and driving control information based on the updated map data D1340. The processor 870 may control the object detection device 810 to generate third object information about the surroundings of the vehicle 100, while the vehicle 100 is driving again in the first section A1310 based on the generated driving route and driving control information.

A driving route generated based on the updated map data D1340 may include a driving route generated based on the map data D1340 prior to the update.

The number of driving routes that may be generated based on the updated map data D1340 may be larger than the number of driving routes that may be generated based on the map data D1340 prior to the update.

Thus, when the vehicle 100 drives based on the updated map data D1340, the vehicle 100 may drive in various driving routes upon occurrence of an unexpected incident during driving more flexibly than when the vehicle 100 drives based on the prior-update map data D1340.

The processor 870 may update and store the map data D1340 based on the sensed third object information.

In this case, the processor 870 may determine whether to store the third object information by comparing the third object information with the map data D1340.

Figure 13F:
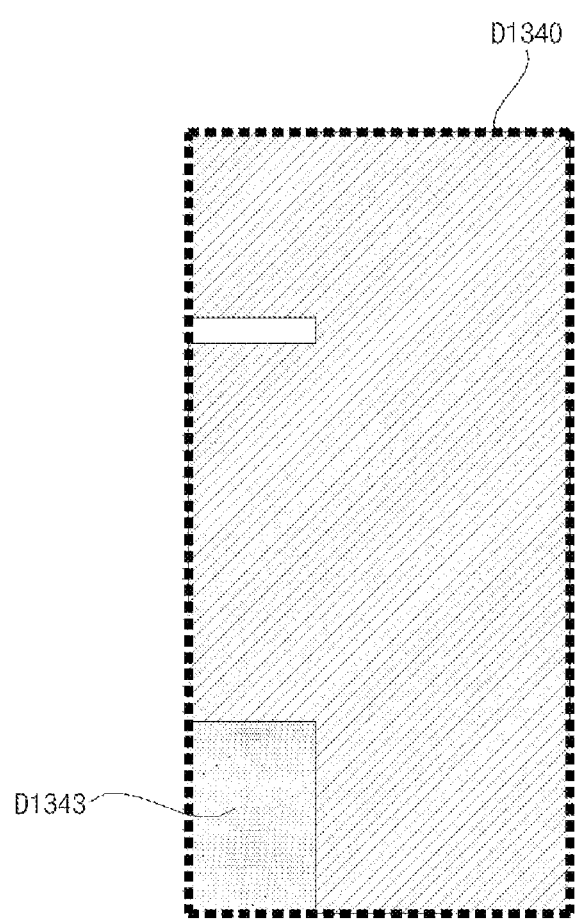

Referring to FIG. 13F, the processor 870 may determine new information D1343 in the third object information, which has not been stored in the map data D1340.

The processor 870 may update the map data D1340 with the part D1343 of the third object information, determined to be new information, and store the updated map data.

In this case, the processor 870 may update the map data D1340 with a coverage rate obtained by calculating a ratio of an area covered by the stored object information in the updated map data D1340 to the total area of the road OB1320 in the first section A1310, and store the updated map data.

Figure 14:
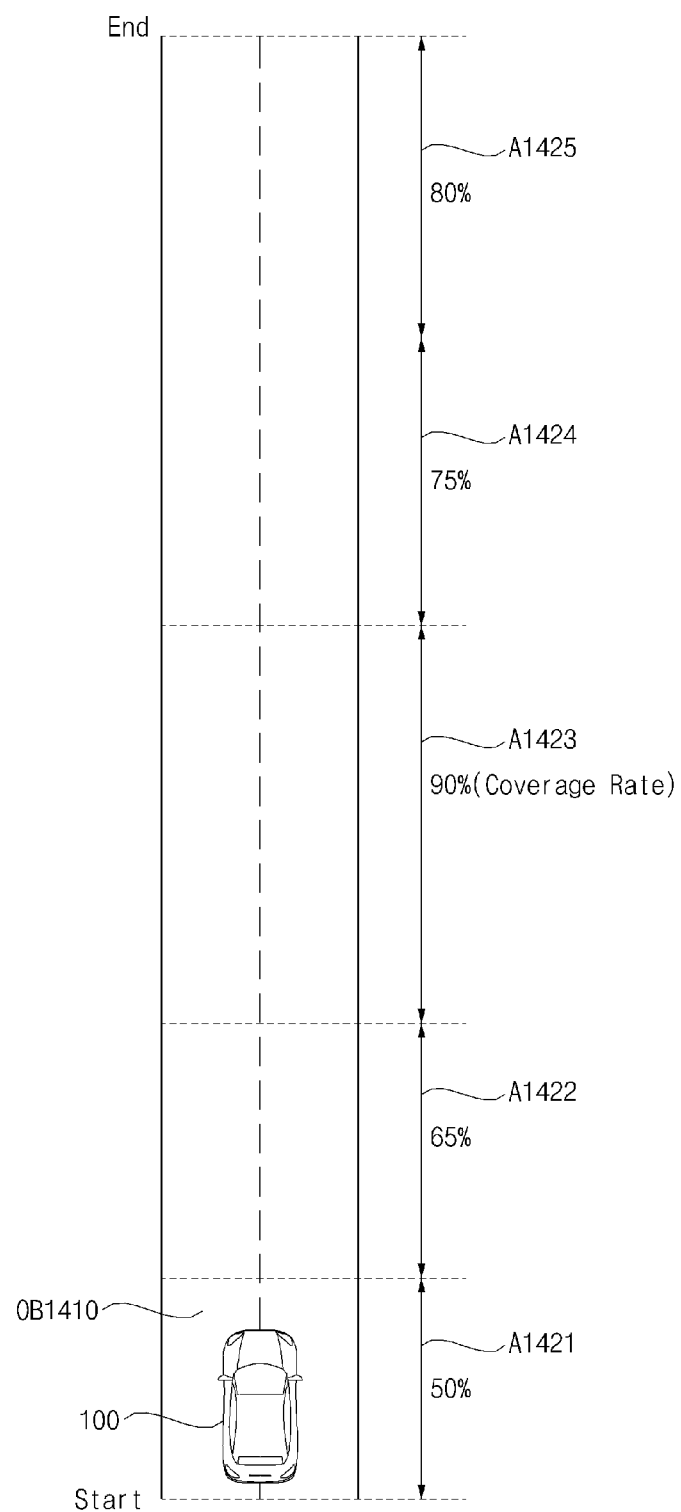

FIG. 14 is a view referred to for describing an operation system according to an implementation of the present disclosure.

The processor 870 may determine whether map data for a first geographic section spanning from a departure to a destination has been stored in the memory 140.

If determining that the map data for the first geographic section has not been stored in the memory 140, the processor 870 may control the object detection device 810 to generate first object information by monitoring the surroundings of the vehicle 100 that is driving according to a user-input-based control in the first geographic section.

The processor 870 may store map data based on the generated first object information.

The processor 870 may generate map data based on the generated first object information in terms of object location information.

The processor 870 may store the generated map data in the memory 140.

The processor 870 may generate a driving route and driving control information based on the stored map data.

The processor 870 may determine an available driving mode for the driving route based on the stored map data.

The processor 870 may determine an available driving mode from among a plurality of driving modes including manned autonomous driving, unmanned autonomous driving, and manual driving, based on a coverage rate.

The plurality of driving modes may include an unmanned autonomous driving mode, a manned autonomous driving mode requiring a driver aboard, a manned autonomous driving mode requiring match between the gaze of a driver and a driving direction, and a manual driving mode.

The processor 870 may divide a driving route into a plurality of sections and determine an available driving mode for each of the sections.

FIG. 14 is a view illustrating a simplified section in which the vehicle 100 travels from a departure to a destination.

Referring to FIG. 14, the processor 870 may divide a total section from a departure to a destination into a plurality of sections A1421 to A1425.

The processor 870 may divide the total driving section of the vehicle 100 into the plurality of sections A1421 to A1425 based on distances and/or coverage rates.

For example, when the processor 870 divides the section according to coverage rates, the processor 870 may define a section with a coverage rate of 50 to 60% as one section, a section with a coverage rate of 60 to 70% as another section, and a section with a coverage rate of 70 to 80% as a third section.

If determining that the coverage rate of the departure to a first spot is 50%, the processor 870 may determine the departure to the first spot to be the first section A1421.

If determining that the coverage rate of the first spot to a second spot is 65%, the processor 870 may determine the first spot to the second spot to be the second section A1422.

If determining that the coverage rate of the second spot to a third spot is 90%, the processor 870 may determine the second spot to the third spot to be a third section A1423.

If determining that the coverage rate of the third spot to a fourth spot is 75%, the processor 870 may determine the e third spot to the fourth spot to be the fourth section A1424.

If determining that the coverage rate of the fourth spot to a fifth spot is 80%, the processor 870 may determine the fourth spot to the fifth spot to be the fifth section A1425.

The lengths of the plurality of sections A1421 to A1425 may be different.

The processor 870 may determine a driving mode for each of the plurality of sections A1421 to A1425.

For example, the processor 870 may determine that only the manual driving mode is available for the first section A1421 with a coverage rate of 50%.

For example, the processor 870 may determine that only the manual driving mode is available for the second section A1422 with a coverage rate of 65%.

For example, the processor 870 may determine that the autonomous driving mode requiring a driver aboard, the autonomous driving mode requiring match between the gaze of a driver and a driving direction, and the manual driving mode are available for the third section A1423 with a coverage rate of 90%.

For example, the processor 870 may determine that only the manual driving mode is available for the fourth section A1424 with a coverage rate of 75%.

For example, the processor 870 may determine that the autonomous driving mode requiring match between the gaze of a driver and a driving direction, and the manual driving mode are available for the fifth section A14253 with a coverage rate of 80%.

The processor 870 may determine a driving mode according to a user input.

Or if autonomous driving is possible in the absence of a user input, the processor 870 may determine the autonomous driving mode to be a driving mode.

If determining that the vehicle 100 is capable of autonomous diving in a driving route generated based on map data, the processor 870 may control the vehicle drive device 600 so that the vehicle 100 may autonomously drive in the driving route.

Figure 15:
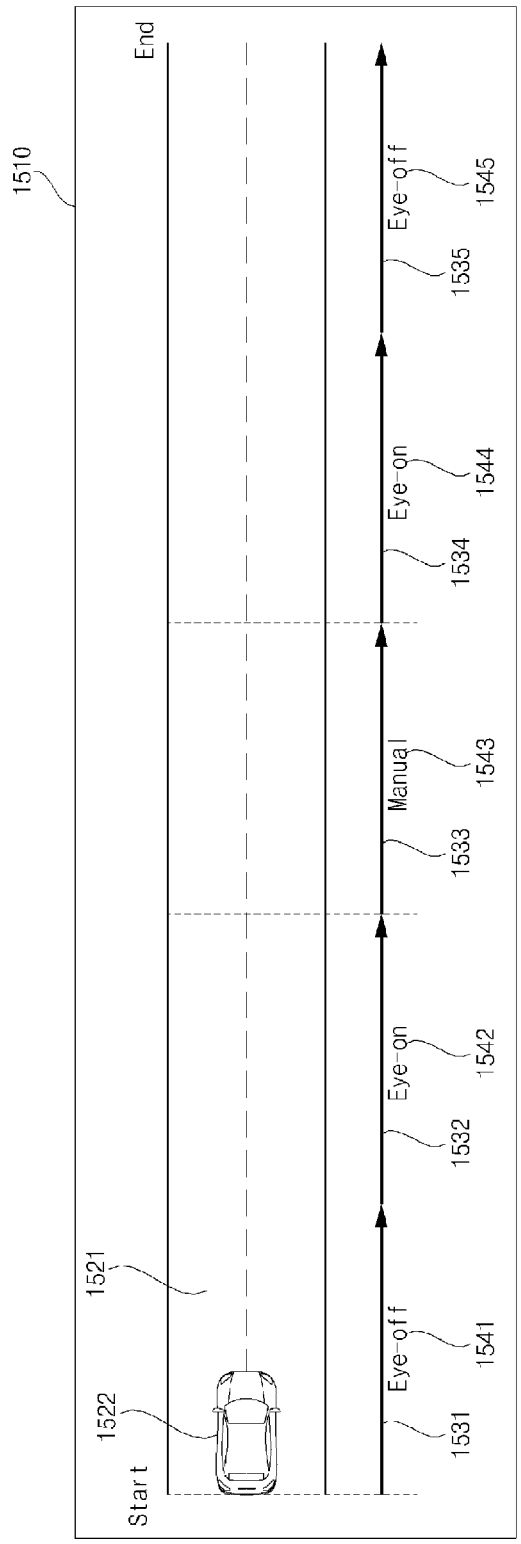

FIG. 15 is a view referred to for describing an operation system according to an implementation of the present disclosure.

The processor 870 may control the output unit 250 to display information generated based on a coverage rate.

The processor 870 may control the output unit 250 to display information about a driving mode of the vehicle 100.

Reference numeral 1510 denotes a screen displayed on the display unit 251.

Referring to FIG. 15, the processor 870 may control the display unit 251 to display a graphic object 1521 representing a driving route and a graphic object 1522 representing the vehicle 100.

The processor 870 may control the display unit 251 to move the graphic object 1522 representing the vehicle 100 along the graphic object 1521 representing the driving route, as the vehicle 100 drives along the driving route.

The processor 870 may determine an available mode for the generated driving route based on stored map data.

The processor 870 may divide the driving route into a plurality of sections according to coverage rates, and determine an available driving mode for each of the plurality of sections.

The processor 870 may control the display unit 251 to display graphic objects 1531 to 1535 representing the plurality of sections divided according to the coverage rates.

The processor 870 may control the display unit 251 to display text and/or graphic objects 1541 to 1545 representing driving modes.

The processor 870 may control the display unit 251 to display the graphic objects 1531 to 1535 representing sections according to driving modes, differently in terms of at least one of shape, color, and movement.

As is apparent from the foregoing description, the implementations of the present disclosure have the following one or more effects.

First, as a vehicle generates an improved driving route based on map data updated by a plurality of drives in a predetermined section, its autonomous driving capability may be increased.

Secondly, the driving safety of the vehicle may be increased.

The present disclosure may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor or a controller. The above implementations are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method for controlling a vehicle, the method comprising:

determining, by at least one processor, whether map data for a first geographic section has been stored in at least one memory;

based on a determination that map data for the first geographic section has not been stored:

generating, through an object detection device and in a first state in which the vehicle drives through the first geographic section according to a user-input-based control, first object information related to surroundings of the vehicle driving through the first geographic section; and storing, by the at least one processor and in the at least one memory, first map data based on the first object information that was generated in the first state in which the vehicle drives through the first geographic section;

based on the first map data for the first geographic section having been stored in the at least one memory, generating, by the at least one processor and based on the stored first map data, a driving route and driving control information for driving the vehicle through the first geographic section;

generating, through the object detection device and in a second state in which the vehicle drives along the generated driving route through the first geographic section, second object information related to surroundings of the vehicle driving through the first geographic section;

updating, by the at least one processor, the stored first map data based on the second object information to generate second map data; and storing, by the at least one processor and in the at least one memory, the second map data, wherein storing the first map data based on the first object information that was generated in the first state in which the vehicle drives through the first geographic section according to the user-input-based control comprises:

determining, based on the first object information, at least one of (i) first object location information indicating a location of an object in the first geographic section, or (ii) first object shape information indicating a shape of an object in the first geographic section;

determining the first map data based on the at least one of the first object location information or the first object shape information; and storing the first map data that was determined based on the at least one of the first object location information or the first object shape information.

2. The method according to claim 1, wherein generating the first object information in the first state in which the vehicle drives through the first geographic section according to the user-input-based control comprises:

receiving, through a communication device of the vehicle and from at least one of a server, another vehicle, or a pedestrian, object information about an object located in the first geographic section.

3. The method according to claim 1, wherein updating the stored first map data to generate the second map data based on the second object information that was generated in the second state in which the vehicle drives along the generated driving route through the first geographic section comprises:

determining whether at least a portion of the second object information matches the stored first map data; and updating the stored first map data to generate the second map data based on a result of determining whether at least a portion of the second object information matches the stored first map data.

4. The method according to claim 1, further comprising:
controlling, by the at least one processor, a vehicle drive device of the vehicle to perform autonomous driving of the vehicle based on the driving route and the driving control information that were generated from the stored first map data for driving the vehicle through the first geographic section.

5. The method according to claim 4, wherein the method further comprises:
based on a determination that the at least a portion of the second object information is not reflected in the stored first map data:
controlling the vehicle drive device to perform autonomous driving based on the driving route and the driving control information at a second speed that is smaller than a first speed at which the vehicle drive device performs autonomous driving based on the driving route and the driving control information prior to the determination that the at least a portion of the second object information is not reflected in the stored first map data.

6. The method according to claim 4, wherein controlling the vehicle drive device to perform autonomous driving based on the driving route and the driving control information that were generated from the stored first map data for driving the vehicle through the first geographic section comprises:
determining a coverage rate that indicates a size of a first geographic area for which object information has been stored relative to a size of a second geographic area for which object information has not been stored;
determining whether autonomous driving is appropriate based on the coverage rate; and
controlling the vehicle drive device to enable autonomous driving of the vehicle based on a determination that autonomous driving is appropriate.

7. The method according to claim 6, wherein the determination of whether autonomous driving is appropriate comprises:
determining, based on the coverage rate, an available driving mode from among a plurality of driving modes that comprises at least two of a manned autonomous driving mode, an unmanned autonomous driving mode, or a manual driving mode.

8. The method according to claim 6, wherein the determination of whether autonomous driving is appropriate comprises:
determining, based on the driving route, a plurality of sections of the driving route that have different coverage rates; and
determining whether autonomous driving is appropriate for at least one section among the plurality of sections of the driving route.

9. The method according to claim 6, further comprising:
determining, based on the coverage rate in the first geographic section, a park-out path along which the vehicle drive device is to perform autonomous driving to exit from a parking space; and
controlling the vehicle drive device to perform autonomous driving of the vehicle to exit from the parking space according to the determined park-out path.

10. The method according to claim 6, further comprising:
determining, based on the coverage rate in the first geographic section, a park-in path along which the vehicle drive device is to perform autonomous driving to enter a parking space; and
controlling the vehicle drive device to perform autonomous driving of the vehicle to enter the parking space according to the determined park-in path.

11. The method according to claim 1, wherein updating the stored first map data to generate the second map data based on the second object information that was generated in the second state in which the vehicle drives along the generated driving route through the first geographic section comprises:
determining, based on the second object information, at least one of (i) second object location information indicating a location of an object in the first geographic section, or (ii) second object shape information indicating a shape of an object in the first geographic section; and
updating the first map data to generate the second map data based on the at least one of the second object location information or the second object shape information.

12. The method according to claim 11,
wherein the determining of whether at least a portion of the second object information matches the stored first map data is further based on the second object location information, and
wherein the updating of the stored first map data to generate the second map data comprises:
based on a determination that a portion of the second object information does not match the stored first map data based on the second object location information, generating the second map data by updating the stored first map data to include the portion of the second object information that is determined not to match the stored first map data.

13. The method according to claim 11,
wherein determining whether at least a portion of the second object information matches the stored first map data comprises:
determining, based on the second object location information, whether at least a portion of the second object information matches the stored first map data; and
based on a determination that a first portion of the second object information matches the stored first map data based on the object location information, determining whether the first portion of the second object information matches the stored first map data based on the object shape information, and
wherein the updating of the stored first map data to generate the second map data comprises:
based on a determination that the first portion of the second object information matches the stored first map data based on the object location information, and that the first portion of the second object information does not match the stored first map data based on the object shape information, generating the second map data by updating the stored first map data to include the first portion of the second object information.

14. The method according to claim 1,
wherein the stored first map data comprises a plurality of stored first map data, each of the plurality of stored first map data corresponding to a respective time period, and
wherein updating the stored first map data to generate the second map data comprises updating the plurality of stored first map data classified according to the respective time period.

15. The method according to claim 14, wherein each of the plurality of stored first map data further comprises information about a traffic congestion degree of the first geographic section for the corresponding time period.

16. The method according to claim 15, wherein the generation of the driving route and driving control information for driving the vehicle through the first geographic section comprises:
   determining, based on the plurality of stored first map data classified according to respective time periods, a driving pattern comprising a lane change operation; and
   generating the driving route and the driving control information based on the plurality of stored first map data classified according to the respective time periods and based on the driving pattern.

17. The method according to claim 1, wherein the updating of the stored first map data to generate the second map data comprises updating the stored first map data to include a driving history of a driver in the first geographic section.

18. The method according to claim 1, wherein the map data comprises first information for a fixed object and second information for a mobile object.

19. An operation system of a vehicle, comprising:
   an object detection device;
   at least one processor; and
   at least one computer-readable medium having stored thereon instructions that, when executed by the at least one processor, cause the at least one processor to perform operations comprising:
      generating, through the object detection device, object information about surroundings of the vehicle driving through a first geographic section;
      determining whether at least one portion of the object information that matches stored map data, wherein the stored map data were generated in a first state in which the vehicle drives through the first geographic section according to a user-input-based control, and determined based on at least one of (i) first object location information indicating a location of an object in the first geographic section, or (ii) first object shape information indicating a shape of an object in the first geographic section;
      updating the stored map data based on a result of determining whether at least one portion of the object information matches the stored map data;
      storing the updated map data; and
      generating a driving route for the vehicle based on the updated map data,
   wherein the driving route comprises a prior driving route that was generated based on the map data prior to the updating of the map data.

* * * * *